United States Patent
Furukawa

(10) Patent No.: US 11,019,550 B2
(45) Date of Patent: May 25, 2021

(54) CONTROLLING TREE TOPOLOGY OVER MESH TOPOLOGY BASED ON AUTONOMOUS DECENTRALIZED CONTROL

(71) Applicant: PicoCELA Inc., Tokyo (JP)

(72) Inventor: Hiroshi Furukawa, Tokyo (JP)

(73) Assignee: PICOCELA INC., Tokyo (JP)

(*) Notice: Subject to any disclaimer, the term of this patent is extended or adjusted under 35 U.S.C. 154(b) by 117 days.

(21) Appl. No.: 16/401,326

(22) Filed: May 2, 2019

(65) Prior Publication Data

US 2020/0275342 A1  Aug. 27, 2020

(30) Foreign Application Priority Data

May 2, 2018  (JP) .............................. JP2018-088632

(51) Int. Cl.
*H04W 40/08* (2009.01)
*H04W 40/14* (2009.01)
*H04W 40/24* (2009.01)

(52) U.S. Cl.
CPC ........... *H04W 40/08* (2013.01); *H04W 40/14* (2013.01); *H04W 40/24* (2013.01)

(58) Field of Classification Search
CPC ..... H04W 40/02; H04W 40/08; H04W 40/12; H04W 40/14; H04W 40/24; H04W 48/22
See application file for complete search history.

(56) References Cited

U.S. PATENT DOCUMENTS

2007/0206547 A1* 9/2007 Gong .................... H04W 40/02
370/338
2007/0274275 A1* 11/2007 Laroia ............... H04W 52/0229
370/338
2010/0188971 A1* 7/2010 Chiang ................... H04L 45/64
370/225
2010/0290441 A1* 11/2010 Stewart ................ H04W 40/12
370/338
2012/0320781 A1  12/2012 Furukawa et al.
2015/0249595 A1* 9/2015 Geiger ................... H04L 45/24
370/392

(Continued)

FOREIGN PATENT DOCUMENTS

| CN | 106658633 A | 5/2017 |
| JP | 2005-143046 A | 6/2005 |
| WO | 2011/105371 A1 | 9/2011 |

OTHER PUBLICATIONS

Extended European Search Report dated Sep. 10, 2019 from EP Application No. 19171910.3, 10 pages.

*Primary Examiner* — Mewale A Ambaye
(74) *Attorney, Agent, or Firm* — Brundidge & Stanger, P.C.

(57) ABSTRACT

A first wireless node transmits a control signal to be propagated to each of a plurality of wireless links linked up between a plurality of wireless nodes that forms a backhaul network. Each of second wireless nodes that is different from the first wireless node selects, for a transmission route of a data signal, a wireless link corresponding to one of different routes in an upstream direction toward the first wireless node among the linked up wireless links, based on an indicator indicative of a radio wave propagation quality of one or more wireless links through which a plurality of the control signals received from different routes are propagated.

15 Claims, 17 Drawing Sheets

(56) References Cited

U.S. PATENT DOCUMENTS

2015/0257166 A1* 9/2015 Weizman .............. H04W 40/12
455/452.2
2017/0099689 A1* 4/2017 Kalhan ................. H04W 72/04
2020/0052997 A1* 2/2020 Ramanathan ........... H04L 45/20

* cited by examiner

FIG. 8A
| PERIPHERAL NODE INFORMATION IN CN #0 | |
|---|---|
| SN #1 | ID #1 |
| SN #2 | ID #2 |
| SN #3 | ID #3 |

FIG. 8B
| PERIPHERAL NODE INFORMATION IN SN #1 | |
|---|---|
| CN #0 | ID #0 |
| SN #2 | ID #2 |
| SN #4 | ID #4 |
| SN #5 | ID #5 |

FIG. 8C
| PERIPHERAL NODE INFORMATION IN SN #2 | |
|---|---|
| CN #0 | ID #0 |
| SN #1 | ID #1 |
| SN #3 | ID #3 |
| SN #5 | ID #5 |
| SN #7 | ID #7 |

FIG. 8D
| PERIPHERAL NODE INFORMATION IN SN #3 | |
|---|---|
| CN #0 | ID #0 |
| SN #2 | ID #2 |

FIG. 8E
| PERIPHERAL NODE INFORMATION IN SN #4 | |
|---|---|
| SN #1 | ID #1 |
| SN #5 | ID #5 |
| SN #6 | ID #6 |

FIG. 8F
| PERIPHERAL NODE INFORMATION IN SN #5 | |
|---|---|
| SN #1 | ID #1 |
| SN #2 | ID #2 |
| SN #4 | ID #4 |
| SN #6 | ID #6 |
| SN #7 | ID #7 |

FIG. 8G
| PERIPHERAL NODE INFORMATION IN SN #6 | |
|---|---|
| SN #4 | ID #4 |
| SN #5 | ID #5 |

FIG. 8H
| PERIPHERAL NODE INFORMATION IN SN #7 | |
|---|---|
| SN #2 | ID #2 |
| SN #5 | ID #5 |

FIG. 10A

| PERIPHERAL NODE INFORMATION IN CN #0 | |
|---|---|
| SN #1 | ID #1 |
| SN #2 | ID #2 |
| SN #3 | ID #3 |

FIG. 10B

| PERIPHERAL NODE INFORMATION IN SN #1 | |
|---|---|
| CN #0 | ID #0 |
| SN #2 | ID #2 |
| SN #4 | ID #4 |
| SN #5 | ID #5 |

FIG. 10C

| PERIPHERAL NODE INFORMATION IN SN #2 | |
|---|---|
| CN #0 | ID #0 |
| SN #1 | ID #1 |
| SN #3 | ID #3 |
| SN #5 | ID #5 |
| SN #7 | ID #7 |

FIG. 10D

| PERIPHERAL NODE INFORMATION IN SN #3 | |
|---|---|
| CN #0 | ID #0 |
| SN #2 | ID #2 |

FIG. 10E

| PERIPHERAL NODE INFORMATION IN SN #4 | |
|---|---|
| SN #1 | ID #1 |
| SN #5 | ID #5 |
| SN #6 | ID #6 |

FIG. 10F

| PERIPHERAL NODE INFORMATION IN SN #5 | |
|---|---|
| SN #1 | ID #1 |
| SN #2 | ID #2 |
| SN #4 | ID #4 |
| SN #6 | ID #6 |
| SN #7 | ID #7 |

FIG. 10G

| PERIPHERAL NODE INFORMATION IN SN #6 | |
|---|---|
| SN #4 | ID #4 |
| SN #5 | ID #5 |

FIG. 10H

| PERIPHERAL NODE INFORMATION IN SN #7 | |
|---|---|
| SN #2 | ID #2 |
| SN #5 | ID #5 |

FIG. 11A

| PERIPHERAL NODE INFORMATION IN CN #0 | |
|---|---|
| SN #1 | ID #1 |
| SN #2 | ID #2 |
| SN #3 | ID #3 |

FIG. 11B

| PERIPHERAL NODE INFORMATION IN SN #1 | |
|---|---|
| CN #0 | ID #0 |
| SN #2 | ID #2 |
| SN #4 | ID #4 |
| SN #5 | ID #5 |

FIG. 11C

| PERIPHERAL NODE INFORMATION IN SN #2 | |
|---|---|
| CN #0 | ID #0 |
| SN #1 | ID #1 |
| SN #3 | ID #3 |
| SN #5 | ID #5 |
| SN #7 | ID #7 |

FIG. 11D

| PERIPHERAL NODE INFORMATION IN SN #3 | |
|---|---|
| CN #0 | ID #0 |
| SN #2 | ID #2 |

FIG. 11E

| PERIPHERAL NODE INFORMATION IN SN #4 | |
|---|---|
| SN #1 | ID #1 |
| SN #5 | ID #5 |
| SN #6 | ID #6 |

FIG. 11F

| PERIPHERAL NODE INFORMATION IN SN #5 | |
|---|---|
| SN #1 | ID #1 |
| SN #2 | ID #2 |
| SN #4 | ID #4 |
| SN #6 | ID #6 |
| SN #7 | ID #7 |

FIG. 11G

| PERIPHERAL NODE INFORMATION IN SN #6 | |
|---|---|
| SN #4 | ID #4 |
| SN #5 | ID #5 |

FIG. 11H

| PERIPHERAL NODE INFORMATION IN SN #7 | |
|---|---|
| SN #2 | ID #2 |
| SN #5 | ID #5 |

CONTROLLING TREE TOPOLOGY OVER MESH TOPOLOGY BASED ON AUTONOMOUS DECENTRALIZED CONTROL

CROSS REFERENCE TO RELATED APPLICATIONS

This application is entitled to (or claims) the benefit of Japanese Patent Application No. 2018-088632, filed on May 2, 2018, the disclosure of which including the specification, drawings and abstract is incorporated herein by reference in its entirety.

TECHNICAL FIELD

The embodiment(s) discussed herein is directed to a wireless route control method, a wireless communication system, and a wireless node.

BACKGROUND ART

Most of existing cellular communication systems employ a configuration in which a base station providing a wireless access link for a user apparatus and a backbone network (may also be referred to as a core network) are connected to each other by a wired backhaul (BH) network.

Meanwhile, as one configuration for realizing the new generation mobile communication, a system or a network that connects between a plurality of wireless nodes (for example, base stations or access points) that provide a wireless communication area having a radius of several meters through wireless multi-hop has been under discussion.

For example, unwiring the BH network that is one infrastructure of the mobile communication by the wireless multi-hop eliminates the need for laying of wired cables, and thus it is possible to reduce the laying cost needed for introducing the mobile communication system.

CITATION LIST

Patent Literature

PTL 1
Japanese Patent Application Laid-Open No. 2005-143046
PTL 2
WO 2011/105371

SUMMARY

As the configurations of the wireless multi-hop connection, for example, a mesh network in which wireless nodes are connected to form a mesh topology, and a tree structure network having a specific wireless node among the plurality of wireless nodes as the top are discussed.

However, in either configuration of networks, for example, when a change (update or reconstruction) in a route becomes necessary due to a variation in the radio wave propagation quality between any of the wireless nodes, a communication disconnection occurs due to route searching and/or link re-establishing, for example. In other words, there is room for improvement regarding a performance of tracking a route change for either configuration of networks.

An object is to improve the performance of tracking a route change in accordance with a variation in radio wave propagation quality between wireless nodes forming a backhaul network and to suppress the occurrence of communication disconnection associated with the route change.

A wireless route control method according to one aspect includes: transmitting a control signal from a first wireless node among a plurality of wireless nodes that forms a backhaul network, the control signal being a signal to be propagated by each of a plurality of wireless links linked up between the plurality of wireless nodes; and selecting, for a transmission route of a data signal, by each of second wireless nodes among the plurality of wireless nodes, the second wireless nodes being different from the first wireless node, a wireless link corresponding to one of different routes in an upstream direction toward the first wireless node from among wireless links linked up in each of the second wireless nodes, based on an indicator indicative of a radio wave propagation quality of one or more of the wireless links through which each of a plurality of the control signals received through different routes has propagated.

A wireless communication system according to one aspect includes: a first wireless node being one of a plurality of wireless nodes that forms a backhaul network, the first wireless node transmitting a control signal to be propagated by each of a plurality of wireless links linked up between the plurality of wireless nodes; and a second wireless node being different from the first wireless node and being one of a plurality of second wireless nodes among the plurality of wireless nodes, the second wireless node selecting, for a transmission route of a data signal, a wireless link corresponding to one of different routes in an upstream direction toward the first wireless node from among wireless links linked up in the second wireless node, based on an indicator indicative of a wireless wave propagation quality of one or more wireless links through which each of a plurality of the control signals received through different routes has propagated.

A wireless node according to one aspect is a first wireless node being one of a plurality of wireless nodes, the first wireless node including: a generation circuitry that generates a control signal to be propagated by each of a plurality of wireless links linked up between the plurality of wireless nodes that forms a backhaul network; and a transmission circuitry that transmits the control signal to a wireless link linked up in the first wireless node, in which the control signal is used by each of a plurality of second wireless nodes among the plurality of wireless nodes to select, the second wireless nodes being different from the first wireless node, for a transmission route of a data signal, a wireless link corresponding to one of different routes in an upstream direction toward the first wireless node from among wireless links linked up in the second wireless node, based on an indicator indicative of a radio wave propagation quality of one or more of the wireless links through which each of a plurality of the control signals received through different routes has propagated.

A wireless node according to one aspect is one of a plurality of second wireless nodes different from a first wireless node among a plurality of wireless nodes, the second wireless node including: a reception circuitry that receives, through one or more wireless links linked up in the second wireless nodes among a plurality of wireless links liked up between the plurality of wireless nodes that forms a backhaul network, a control signal transmitted by the first wireless node to be propagated by the plurality of wireless links; and a selection circuitry that selects, for a transmission route of a data signal, a wireless link corresponding to one of different routes in an upstream direction toward the first wireless node from among wireless links linked up in the second wireless node, based on an indicator indicative of a wireless wave propagation quality of one or more of the wireless links through which each of a plurality of the control signals received through different routes has propagated.

A computer-readable non-transitory recording medium includes a wireless route control program recorded therein, the program causing a processor provided in a first wireless node being one of a plurality of wireless nodes to perform processing including: generating a control signal to be propagated by each of a plurality of wireless links linked up between the plurality of wireless nodes that forms a backhaul network; and transmitting the control signal to a wireless link linked up in the first wireless node, in which the control signal is used by each of a plurality of second wireless nodes among the plurality of wireless nodes to select, the second wireless nodes being different from the first wireless node, for a transmission route of a data signal, a wireless link corresponding to one of different routes in an upstream direction toward the first wireless node from among wireless links linked up in the second wireless node, based on an indicator indicative of a radio wave propagation quality of one or more of the wireless links through which each of a plurality of the control signals received through different routes has propagated.

A computer-readable non-transitory recording medium includes a wireless route control program recorded therein, the program causing a processor provided in one of a plurality of second wireless nodes different from a first wireless node among a plurality of wireless nodes to perform processing including: receiving, through one or more wireless links linked up in the second wireless node among a plurality of wireless links liked up between the plurality of wireless nodes that forms a backhaul network, a control signal transmitted by the first wireless node to be propagated by the plurality of wireless links; and selecting, for a transmission route of a data signal, a wireless link corresponding to one of different routes in an upstream direction toward the first wireless node from among wireless links linked up in the second wireless node, based on an indicator indicative of a radio wave propagation quality of one or more of the wireless links through which each of a plurality of the control signals received through different routes has propagated.

A wireless route control method according to one aspect includes selecting at least a part of a plurality of wireless links linked up between a plurality of wireless nodes, for an element of a wireless link set that forms a route with a tree structure having a specific wireless node on a top.

The performance of tracking the route change in accordance with a variation in radio wave propagation quality between a plurality of wireless nodes forming a backhaul network can be improved, and the occurrence of communication disconnection associated with a route change can be suppressed.

BRIEF DESCRIPTION OF DRAWINGS

FIGS. 8A to 8H each illustrate one example of peripheral node information managed in each of the nodes exemplified in FIG. 7;

FIGS. 10A to 10H each illustrate selection examples of link information in each of the nodes in correspondence with the tree route exemplified in FIG. 9A;

FIGS. 11A to 11H each illustrate a selection example of link information in each of the nodes in correspondence with the tree route exemplified in FIG. 9B;

DESCRIPTION OF EMBODIMENTS

Figure 1:
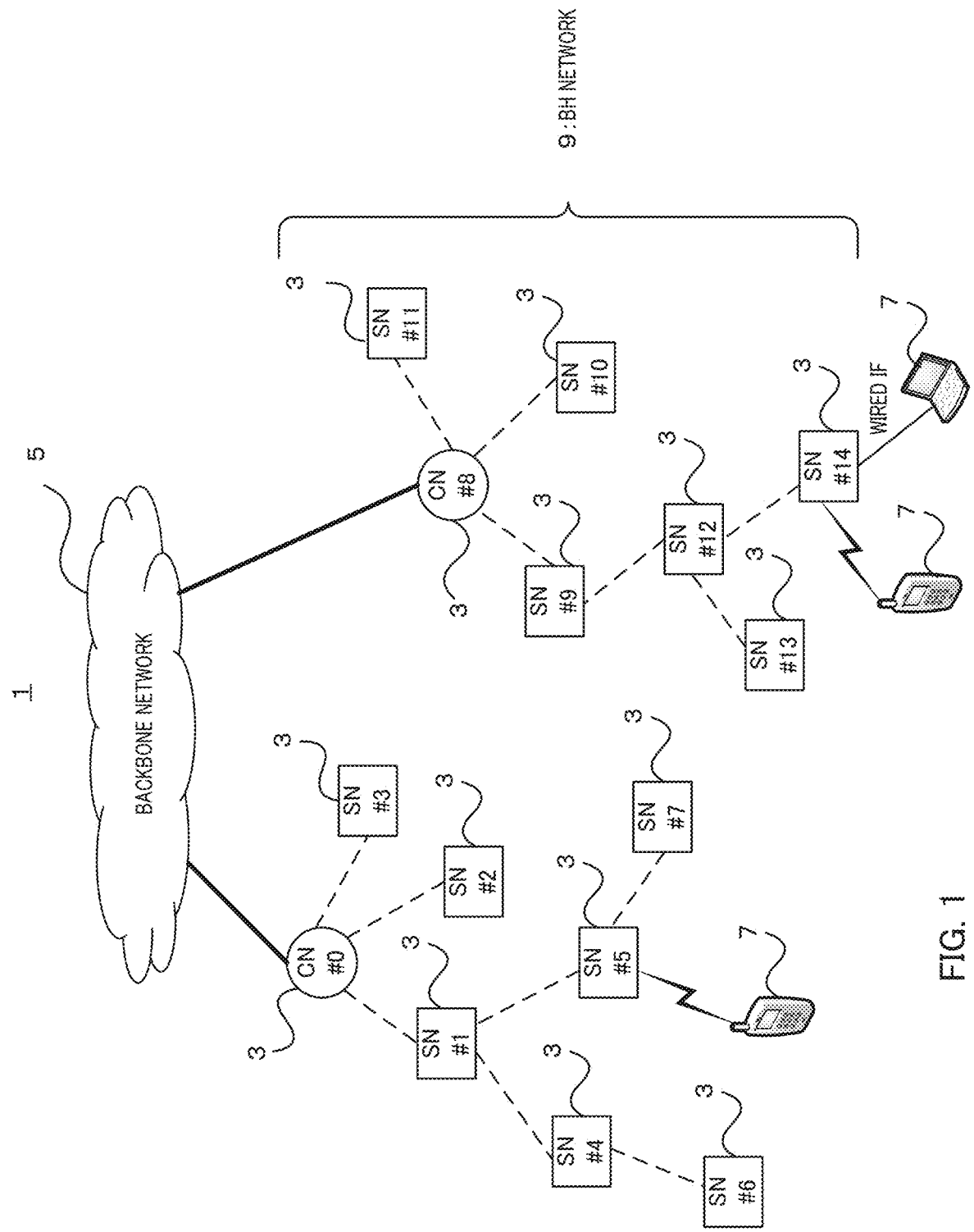
FIG. 1 is a block diagram illustrating a configuration example of a wireless communication system according to one embodiment.

Hereinafter, a detailed description will be given of embodiments with reference to the accompanying drawings.

The embodiments are described below with reference to the accompanying drawings, as appropriate. The same elements are denoted by the same reference characters throughout the entire description unless otherwise noted. The features described below with the accompanying drawings are for describing an exemplarily embodiment and are not for indicating a sole embodiment. For example, when the order of operations is indicated in the embodiment, the order of the operations may be changed, as appropriate, as long as there is consistency as a whole operation.

When a plurality of embodiments and/or variations are exemplified, some configurations, functions and/or operations in a certain embodiment and/or variation may be included in another embodiment and/or variation, or may be replaced with the configurations, functions and/or operations of the other embodiment and/or variation as long as there is consistency.

In the embodiment, excessively detailed descriptions may be omitted. For example, in order to prevent the description from becoming excessively lengthy and/or the technical features or concept from becoming ambiguous and facilitate the understanding of a person skilled in the art, the detailed description of publicly-known or well-known technical features may be omitted. Overlapping descriptions of substantially same configurations, functions and/or operations may be omitted.

The accompanying drawings and the description below are provided in order to assist the understanding of the embodiment, and it is not intended to thereby limit the subject described in the claims. The terms used in the description below may be replaced with other terms, as appropriate, in order to assist the understanding of a person skilled in the art.

<Configuration Example of System>

FIG. 1 is a block diagram illustrating a configuration example of a wireless communication system according to one embodiment. Wireless communication system 1 illustrated in FIG. 1 exemplarily includes plurality of nodes 3. In FIG. 1, as one non-limiting example, 15 nodes 3 denoted by node numbers #0 to #14 are exemplified. The number of nodes 3 may be two or more and less than 14 or may be 16 or more.

Individual nodes 3 are one example of wireless devices capable of performing wireless communication. Therefore, each of nodes 3 may be referred to as "wireless node 3". Communication protocols conforming to (or based on) wireless local area network (LAN) related standards such as IEEE 802.11b/g/a/n/ac/ad/ay may be applied to the wireless communication.

Individual nodes 3 form areas in which wireless communication is possible. The "areas in which wireless communication is possible" may be referred to as "wireless communication areas", "wireless areas", "communication areas", "service areas", "coverage areas", "cover areas", or the like. The wireless communication area formed by node 3 conforming to or based on the wireless LAN related standard may be understood to correspond to a "cell" that is an address term in cellular communication. For example, the wireless communication areas formed by individual nodes 3 may be understood to be equivalent to "femtocells" that are classified as "small cells".

Each of nodes 3 is available to perform wireless communication with other nodes 3 when nodes 3 are located in the service areas of other nodes 3. Plurality of nodes 3 form wireless backhaul (BH) network 9 that wirelessly relays the communication between backbone network 5 and terminal apparatus 7, for example. The "wireless BH network" may be referred to as a "BH network" by omitting the expression "wireless".

The "BH network" may be referred to as a "relay network". Individual nodes 3 that are entities of BH network 9 may be referred to as "relay nodes".

Backbone network 5 exemplarily is a large scale communication network such as the Internet. The "backbone network" may be referred to as a "core network", a "global network", or the like.

The route or the section through which a wireless signal is transmitted in BH network 9 may be mutually replaced with a "wireless BH communication route", a "wireless BH transmission route", a "wireless BH line", a "wireless BH connection", or a "wireless BH channel". In those terms, the expression "wireless" may be omitted, and the expression "BH" may be replaced with the expression "relay".

Meanwhile, for example, the section in which the wireless signal is transmitted between terminal apparatus 7 and BH network 9 may be referred to as a "wireless access line" or a "wireless access channel". In those terms, the expression "wireless" may be omitted.

In the description below, the term "signal" may be replaced with a term such as "frame" or "packet" that means units by which a signal is separated by time.

Frequencies (channels) that are different from each other may be allocated to the wireless BH line and the wireless access line. As one non-limiting example, a 5 GHz band (for example, from 5.15 GHz to 5.85 GHz) frequency (channel) is allocated to the BH line.

A 2.4 GHz band (for example, from 2.412 GHz to 2.472 GHz) frequency (channel) may be allocated the access line. A 5 GHz band frequency may be allocated to the access line when the frequency is different from the frequency allocated to the BH line.

At least one of a 5.2 GHz band (W52: from 5,150 MHz to 5,250 MHz), a 5.3 GHz band (W53: from 5,250 MHz to 5,350 MHz), and a 5.6 GHz band (W56: from 5,470 MHz to 5,725 MHz), for example, may be included in the 5 GHz band.

The number of channels available in W52 is four, that is 36 ch, 40 ch, 44 ch, and 48 ch. The number of channels available in W53 is four, that is, 52 ch, 56 ch, 60 ch, and 64 ch. The number of channels available in W56 is 11, that is, 100 ch, 104 ch, 108 ch, 112 ch, 116 ch, 120 ch, 124 ch, 128 ch, 132 ch, 136 ch, and 140 ch.

Therefore, for example, when one or two frequency bands among W52, W53, and W56 are allocated to the access line, the remaining one or two frequency bands that are not allocated to the access line among W52. W53, and W56 may be allocated to the BH line.

Some nodes 3 among a plurality of nodes 3 may be connected to backbone network 5 with a wired connection. In FIG. 1, an aspect in which two nodes, that is, node #0 and node #8 are connected to backbone network 5 with a wired connection is exemplified. For example, a LAN cable or an optical fiber cable may be applied to the wired connection.

Node #0 and node #8 connected to backbone network 5 with a wired connection may be referred to as "core nodes (CNs)". Individual nodes 3 among a plurality of nodes 3 forming BH network 9 besides CNs #0 and #8 may be referred to as "slave nodes (SNs)". For example, in FIG. 1, nodes #1 to #7 and #9 to #14 are all SNs. CNs 3 are one example of "first wireless nodes", and each of SNs 3 is one example of a "second wireless node".

In FIG. 1, #0 to #14 denoting individual nodes 3 are one example of information used in the identification of individual nodes 3 (hereinafter may be abbreviated to "node identification information"). Information available to uniquely identify individual nodes 3 in same BH network 9 is sufficient for the node identification information, and such information may be a node number, an identifier of a device, address information, for example. One non-limiting example of address information is a Media Access Control (MAC) address.

BH network 9 may have one or more tree structures (may be referred to as "tree topologies") in which one CN 3 (#0 or #8) is the root node. For example, as illustrated in FIG. 1, in BH network 9, a first tree topology in which CN #0 is the root node and a second tree topology in which CN #8 is the root node may be constructed.

In other words, in BH network 9, a "tree topology" may be constructed for every CN 3. The one or more "tree topologies" constructed in BH network 9 may be referred to as "tree clusters", "tree sub-clusters", or the like. In BH network 9, the number of CNs 3 is not limited to two, and may be one or three or more.

In the tree topology. SN 3 that does not have a child node may be referred to as a "leaf node", and SN 3 that has a child node may be referred to as an "internal node". For example, in FIG. 1, SNs #2, #3, #6, #7, #10, #11, #13, and #14 are all equivalent to a "leaf node". SNs #1, #4, #5, #9, and #12 are all equivalent to an "internal node".

In the wireless BH line, a "downstream line" in the direction from core node 3 toward leaf node 3 and an "upstream line" in the direction from leaf node 3 to core node 3 may be included. The "downstream line" and the "upstream line" may be referred to as a "downlink (DL)" and an "uplink (UL)" after the address terms in the cellular communication.

The flow of the signal (downlink signal) in the "downstream line" may be referred to as a "downstream", and the flow of the signal (uplink signal) in the "upstream line" may be referred to as an "upstream". A control signal and a data signal may be included in each of the "downlink signal" and the "uplink signal". A signal that does not correspond to the "data signal" may be included in the "control signal".

The "child node" may be understood to be equivalent to a node (downstream node) connected to the downstream of a certain node by a wireless link upon focusing on the "downstream line". A node connected to the upstream of a certain node by a wireless link upon focusing on the downstream line may be referred to as a "parent node" or an "upstream node". Upon focusing on the "upstream line", the relationship between the "child node" (downstream node) and the "parent node" (upstream node) is reversed.

Upon focusing on the "downstream line", the "core node" may be referred to as a "start node" or an "origin node", and the "leaf node" may be referred to as an "end node" or an "edge node". The "internal node" may be referred to as an "intermediate node" or a "relay node".

The route (tree topology) of the tree structure in BH network 9 may be constructed on the basis of the metric of the route (hereinafter may be abbreviated to a "route metric") leading to predetermined SN 3 from CN 3, for example. In the route metric, an indicator (hereinafter referred to as a "propagation quality indicator") indicating the quality or the capacity of the radio wave propagation in the wireless section leading to predetermined SN 3 from CN 3 may be used.

As one non-limiting example of the propagation quality indicator, the received power or the received strength (for example, RSSI; Received Signal Strength Indicator) of a wireless signal, the radio wave propagation loss, the propagation delay, and the like may be listed. The "radio wave propagation loss" may be replaced with a "path loss".

One combination or two or more combinations selected from the indicator candidates above may be used in the propagation quality indicator. In this embodiment, an indicator relating to the distance of the route such as the number of hops does not necessarily need to be used in the propagation quality indicator.

For example, by transmitting a signal (for example, a control signal) by designating CN 3 as the starting point, the radio wave propagation loss in the wireless section may be obtained in reception node 3 for each wireless section between transmit node 3 and reception node 3 of the control signal.

When each of reception nodes 3 transmits the information on the obtained radio wave propagation loss by including the information in the control signal, information on the cumulative radio wave propagation loss (in other words, a cumulative value) in the wireless section in which the control signal has been propagated may be sent between nodes 3.

For example, individual nodes 3 calculate a route metric on the basis of the cumulative radio wave propagation loss for each upstream node candidate that is a transmission source of the control signal, and selects one of nodes 3 of which route metric is the smallest, for example, from the upstream node candidates. As a result, a route of a tree structure in which the radio wave propagation loss is the smallest is constructed.

The route (hereinafter may be referred to as a "tree route") of the tree structure may be dynamically or adaptively updated by regularly or irregularly transmitting a control signal by designating CN 3 as the starting point.

The processing or control relating to the construction and update of the tree route as above may be hereinafter referred to as "tree route control", or "dynamic tree route control" or "adaptive tree route control" for the sake of convenience.

In the wireless BH line of this embodiment, the downlink signal (for example, a data signal) may be transmitted from CN 3 toward the downstream of the tree route periodically and intermittently (in other words, after waiting for an intentional transmission waiting time). The periodical and intermittent transmission as above may be referred to as "intermittent periodic transmission" (IPT).

In the IPT, as described in PTL 1 described above, a transmission period (in other words, a transmission interval or a transmission frequency) of the downlink signal to be transmitted from CN 3 toward the downstream is changed in accordance with a frequency reuse interval. The frequency reuse interval indicates the length (distance) of the section in which the occurrence of the interference between the nodes in the same route is suppressed and the same frequency may be repeatedly reused.

By setting the transmission period in accordance with the frequency reuse interval for CN 3, the throughput can be improved, in other words, the relay transmission efficiency can be improved in the wireless BH line without the need of complex congestion control, for example. In addition, the utilization efficiency of the frequency resource in BH network 9 can be improved.

For example, by setting the frequency reuse interval in which the occurrence of the interference between the nodes is suppressed for CN 3, the throughput observed in a leaf node can be maintained at a certain value or more without depending on the number of hops even when a single frequency is used in the tree topology.

For the upstream line, the throughput observed in CN 3 can be improved when SN 3 transmits an uplink signal toward the upstream in accordance with the transmission period linked to the transmission period in accordance with the frequency reuse interval of the downlink line, for example.

Therefore, TDMA or TDD is also easily realized by allocating the same frequency (channel) to the downstream line and the upstream line of the wireless BH line, for example. The "TDMA" is an abbreviation for time division multiple access, and "TDD" is an abbreviation for time division duplex.

Therefore, wireless IFs of different frequencies do not necessarily need to be individually used for the downstream line and the upstream line of the wireless BH line, and a common wireless IF is allowed to be used. By using a common wireless IF, it is possible to downsize and/or reduce costs of nodes 3.

However, different frequencies may be allocated to the downstream line and the upstream line of the wireless BH line. By allocating different frequencies to the downstream line and the upstream line of the wireless BH line, it is possible to simplify IPT control for realizing TDMA or TDD, for example. Even when different frequencies are allocated to the downstream line and the upstream line, two channels, that is, the downstream line and the upstream line are sufficient for the consumption of the frequency resource in BH network 9.

A wired line may be included in a part of the downstream line and/or the upstream line of the BH line. When a wired line is included in a part of the downstream line and/or the upstream line of the BH line, the route metric of the wired section may be calculated by a predetermined value (for example, the minimum value) that is smaller than the propagation loss of the wireless section.

When terminal apparatus 7 is located in the service area of any of SNs 3, terminal apparatus 7 communicates with backbone network 5 via the BH line by being connected to any of plurality of SNs 3 forming BH network 9 through the wireless access line. Terminal apparatus 7 may be connected to any of SNs 3 (SN #14 as one example in FIG. 1) through a wired line (wired IF). As one non-limiting example, terminal apparatus 7 may be a mobile terminal such as a mobile phone, a smartphone, and a tablet terminal.

Any of code division multiple access (CDMA), frequency division multiple access (FDMA), time division multiple access (TDMA), orthogonal frequency division multiple access (OFDMA), single carrier frequency division multiple access (SC-FDMA), and the like may be exemplarily applied to the wireless access line. The OFDMA may be embodied by a wireless technology such as IEEE802.11, IEEE802.16, long term evolution (LTE), LTE-Advanced, and the like, for example.

A multiple input multiple output (MIMO) technology by an antenna array including a plurality of antenna elements may be applied to all or a part of the downstream line and/or the upstream line in the wireless BH line and/or the wireless access line.

For example, beam forming using the antenna array may be performed in the downstream line and/or the upstream line of any one or more sections between CN 3 and SN 3, between SN 3 and SN 3, and between SN 3 and terminal apparatus 7.

The term "transmission" of a signal may be hereinafter mutually replaced with other terms such as "relaying", "transfer", "propagation", "sending", "routing", or "forwarding" of a signal. The "relaying" of a signal may be replaced with the "bridging" of a signal.

The term "transmission" of a signal may include the meaning of "flooding", "broadcasting", "multicasting", "unicasting", or the like of a signal. The term "connection" of a line may be understood to mean a state in which a wired and/or wireless communication link is "established" or "linked up".

The term "apparatus" may be mutually replaced with terms such as "circuit" (or "circuitry"), "device", "unit", or "module". The term "interface (IF)" may be mutually replaced with terms such as "adaptor". "board". "card", "module", or "chip".

The term "terminal apparatus" may be mutually replaced with terms such as a mobile station, a mobile terminal, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, an user agent, a mobile client, or a client.

Node 3 and/or terminal apparatus 7 may be an Internet of things (IoT) device. By the IoT, various "things" may be equipped with a wireless communication function. The various "things" equipped with the wireless communication function may be connected to and communicate with backbone network 5 via the wireless access line and/or the wireless BH line.

For example, the IoT device may include a sensor device, a meter (measuring instrument), or the like having the wireless communication function. Devices having a sensing function and/or a monitoring function such as a monitoring camera and/or a fire alarm equipped with a sensor device and/or a meter may correspond to node 3 and/or terminal apparatus 7. Therefore, BH network 9 may correspond to a sensor network and/or a monitoring network, for example. The wireless communication by the IoT device may be referred to as machine type communications (MTC). Therefore, the IoT device may be referred to as a "MTC device".

<One Example of Protocol Stack of Node 3>

Figure 2:
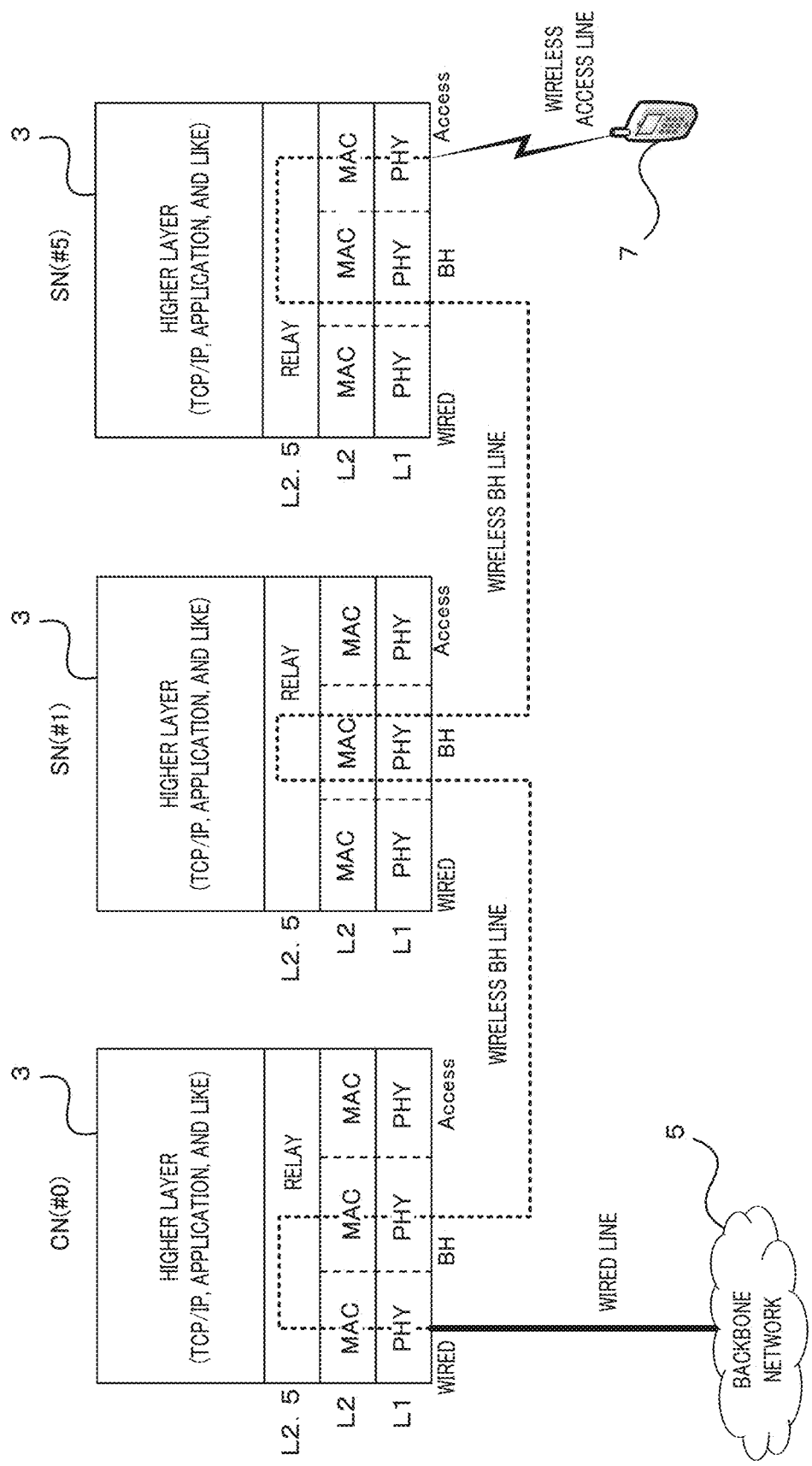
FIG. 2 illustrates one example of a form of connection between nodes according to one embodiment together with protocol stacks of individual nodes.

FIG. 2 illustrates one example of a form of connection between nodes 3 together with the protocol stacks of individual nodes 3. FIG. 2 illustrates CN 3 connected to backbone network 5 by a wired line, and two SNs 3 connected to CN 3 by multi-hop connection by the wireless BH line.

It may be understood that CN 3 in FIG. 2 corresponds to CN #0 in FIG. 1 and two SNs 3 in FIG. 2 respectively correspond to SN #1 and SN #5 in FIG. 1, for example. Terminal apparatus 7 is connected to SN #5 by the wireless access line.

As illustrated in FIG. 2, each of nodes 3 has a protocol stack formed by a physical (PHY) layer (layer 1: L1), a MAC layer (layer 2: L2), a relay layer, and a higher layer equal to or higher than layer 3 (L3), for example. A TCP/IP layer and/or an application layer may be included in the higher layer, for example. The "TCP/IP" is an abbreviation for a "transmission control protocol/Internet protocol".

The "relay layer" is located in an intermediate layer between layer 2 and layer 3 in the protocol stack, and hence may be described as "layer 2.5 (L2.5)" for the sake of convenience. In processing of the relay layer, processing relating to the "adaptive tree route control" and/or processing (or control) relating to the "IPT" described above may be included.

By positioning the "relay layer" as the intermediate layer between layer 2 and layer 3, the processing of the existing MAC layer does not necessarily need to be modified, and hence the implementation of "relay layer" processing is easy. The relay layer processing may be embodied by one or more selected from software, middleware, firmware, and hardware.

For example, the physical layer of node 3 provides one wired connection (wired port) and two wireless connections (wireless ports), and those three ports are indicated as three "PHY" ports in FIG. 2 for the sake of convenience. One of two wireless ports is for the BH line, and the other of the two wireless ports is for the access line. The "port" may be replaced with the "interface (IF)".

In FIG. 2, in order to facilitate the visual understanding of the correspondence relationship among the three PHY ports of the physical layer, the MAC layer is divided into three for the sake of convenience. However, the processing of the MAC layer may be common to the PHY ports.

In FIG. 2, upon focusing on the flow of the downlink signal, the downlink signal from backbone network 5 that is received by CN #0 is transmitted to the downstream BH line from the wireless port for the BH line via the wired port (L1), the MAC layer (L2), and the relay layer (L2.5) of CN #0.

The downlink signal transmitted by CN #0 to the BH line is received at the wireless port for the BH line in SN #1 that is the next hop, and is transmitted to the downstream BH line from the wireless port for the BH line via the MAC layer and the relay layer of SN #1.

The downlink signal transmitted by SN #1 to the downstream BH line is received at the wireless port for the BH line in SN #5 that is the next hop, and is transmitted to terminal apparatus 7 from the wireless port for the access line via the MAC layer of SN #5. The downlink signal transmitted to the access line from the BH line does not necessarily need to pass through the relay layer.

The uplink signal is transmitted to backbone network 5 from terminal apparatus 7 via SN #5, SN #1, and CN #0 following a route opposite to the route of the downlink signal described above.

<Configuration Example of Node 3>

(Hardware Configuration Example of Node 3)

Figure 3:
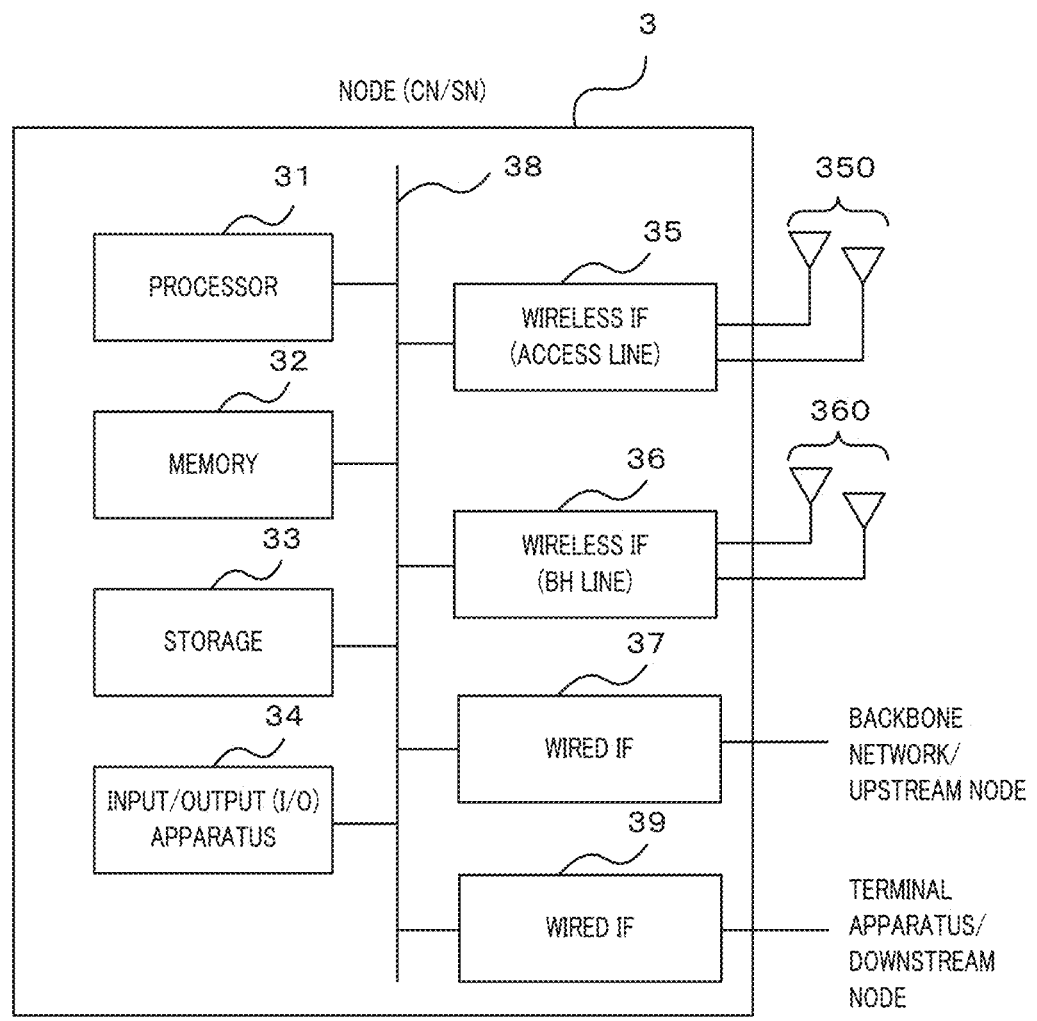
FIG. 3 is a block diagram illustrating a hardware configuration example of the node according to one embodiment.

Next, a hardware configuration example of node 3 is described with reference to FIG. 3. The configuration example exemplified in FIG. 3 may be common to CN 3 and SN 3. As illustrated in FIG. 3, node 3 may include processor 31, memory 32, storage 33, input/output (I/O) apparatus 34, wireless IFs 35 and 36, wired IF 37, wired IF 39, and bus 38, for example.

In the hardware configuration example exemplified in FIG. 3, the increase and decrease of hardware may be performed, as appropriate. For example, a freely-selected hardware block may be added, removed, divided, or integrated into a freely-selected combination, and bus 38 may be added or removed, for example, as appropriate.

Wireless IF 35, wireless IF 36, and wired IF 37 (or wired IF 39) may be understood to correspond to the two wireless ports (PHY ports) and one wired port exemplified in the protocol stack in FIG. 2.

Processor 31, memory 32, storage 33, input/output apparatus 34, wireless IFs 35 and 36, and wired IFs 37 and 39 may be connected to bus 38 and mutually communicate with each other, for example. The number of buses 38 may be one or plural.

Node 3 may include a plurality of processors 31. The processing in node 3 may be executed by one processor 31, or may be executed by a plurality of processors 31. In one or a plurality of processors 31, a plurality of processing may be simultaneously, parallelly, or sequentially executed, or may be executed by other methods. Processor 31 may be a single core processor or a multicore processor. Processor 31 may be implemented using one or more chips.

One or a plurality of functions included in node 3 are exemplarily realized by causing hardware such as processor 31 and memory 32 to read predetermined software. The "software" may be mutually replaced with other terms such as "program", "application", "engine", or "software module".

For example, processor 31 reads and executes a program by controlling one or both of read out and writing of data stored in one or both of memory 32 and storage 33. The program may be provided to node 3 by communication via a telecommunication line by at least one of wireless IF 35, wireless IF 36, and wired IF 37, for example.

The program may be a program that causes a computer to execute all or a part of the processing in node 3. One or more functions of node 3 is realized in accordance with the execution of a program code included in the program. All or a part of the program code may be stored in memory 32 or storage 33, or may be described as a part of an operating system (OS).

For example, the program may include a program code that embodies a function block described below with respect to FIG. 4 and FIG. 5, or may include a program code that executes one or more of flowcharts described below with reference to FIG. 6 and FIG. 12 to FIG. 15. The program including a program code as above may be referred to as a "wireless route control program" for the sake of convenience.

Processor 31 is one example of a processing section, and controls the entire computer by operating the OS, for example. Processor 31 may be formed using a central processing unit (CPU) including an interface between node 3 and peripheral apparatuses, a control apparatus, an arithmetic apparatus, a register, and the like.

Processor 31 executes various processing by reading out one or both of a program and data from storage 33 to memory 32, for example.

Memory 32 is one example of a computer-readable recording medium, and may be formed using at least one of a ROM, an EPROM, an EEPROM, a RAM, an SSD, and the like, for example. The "ROM" is an abbreviation for "Read Only Memory", and "EPROM" is an abbreviation for "Erasable Programmable ROM". "EEPROM" is an abbreviation for "Electrically Erasable Programmable ROM". "RAM" is an abbreviation for "Random Access Memory", and "SSD" is an abbreviation for "Solid State Drive".

Memory 32 may be referred to as a register, a cache, a main memory, a work memory, or a main storage apparatus.

Storage 33 is one example of a computer-readable recording medium, and may be formed using at least one of an optical disc such as a compact disc ROM (CD-ROM), a hard disk drive (HDD), a flexible disc, a magneto-optical disc (for example, a compact disc, a digital versatile disc, or a Blu-ray (registered trademark) disc), a smart card, a flash memory (for example, a card, a stick, or a key drive), a flexible disc, a magnetic strip, and the like. Storage 33 may be referred to as an auxiliary storage apparatus. The recording medium described above may be a database, a server, and other appropriate media including one or both of memory 32 and storage 33, for example.

Input/output (I/O) apparatus 34 is one example of an input device that receives an input of a signal from the outside of node 3 and an output device that outputs a signal to the outside from node 3. In the input device, one or more of a keyboard, a mouse, a microphone, a switch, a button, and a sensor may be exemplarily included. In the output device, one or more of a display, a speaker, and a light emitting device such as a light emitting diode (LED) may be exemplarily included.

The button may include a power button and/or a reset button, for example. The power button is operated for the startup and the shutdown of node 3, for example. The reset (or rerouting) button is operated in order to command an intentional reset and/or reconstruction (or rerouting) of the tree route, for example.

Input/output apparatus 34 may have individual configurations for the input and the output. Input/output apparatus 34 may have a configuration in which the input and the output are integrated as in a touch panel display, for example.

Wireless IF 35 exemplarily performs transmission and reception of the wireless signal in the access line between wireless IF 35 and terminal apparatus 7. In wireless IF 35, one or more antennas 350 and a baseband (BB) signal processing circuit, a MAC processing circuit, an up converter, a down converter, and an amplifier (not illustrated) may be included, for example.

In a BB signal processing circuit of wireless IF 35, an encoding circuit and a modulation circuit for encoding and modulating the transmission signal, and a demodulation circuit and a decoding circuit for demodulating and decoding the reception signal may be exemplarily included.

Wireless IF 36 exemplarily performs transmission and reception of the wireless signal in the BH line between wireless IF 36 and other SNs 3. In wireless IF 36, as with wireless IF 35, one or more antennas 360, and a BB signal processing circuit, a MAC processing circuit, an up converter, a down converter, and an amplifier (not illustrated) may be included.

In the BB signal processing circuit of wireless IF 36, an encoding circuit and a modulation circuit for encoding and modulating a transmission signal, and a demodulation circuit and a decoding circuit for demodulating and decoding a reception signal may be exemplarily included.

Antenna 350 of wireless IF 35 and antenna 360 of wireless IF 36 may be respectively referred to as "access line antenna 350" and "BH line antenna 360". One or both of access line antenna 350 and BH line antenna 360 may be a nondirectional omni antenna, or may be an antenna array for which a directivity control is available. Beam forming may be performed by an antenna array including a plurality of directional antennas.

The plurality of directional antennas may be arranged toward different directions, for example. For example, six directional antennas may be arranged in positions shifted from each other by 60 degrees. When there are a plurality of antennas available to communicate with other nodes 3 that are communication partners in node 3 when a mesh link described below is formed in BH network 9, link up with other nodes 3 may be performed with an antenna having the best communication quality (the gain or the electric power as one example), and the use of the antenna may be continued in the communication of the tree route after the link up. However, the antenna used in the link up and the antenna used in the communication of the tree route after the link up may be different from each other.

Wired IF 37 exemplarily performs wired communications of transceiving a signal with backbone network 5 and/or upstream node 3. Wired IF 39 exemplarily performs wired communications of transceiving a signal with terminal apparatus 7 and/or downstream node 3. A network interface conforming to the Ethernet (registered trademark) standard may be used for wired IFs 37 and 39, for example. Wired IFs 37 and 39 only need to be included in at least CN 3, and do not necessarily need to be included in SN 3 (in other words, may be optional for SN 3). However, when a part of BH line is a wired connection, wired IFs 37 and 39 may be used in the wired connection.

Node 3 may be formed so as to include hardware such as a microprocessor, a DSP, an ASIC, a PLD, and an FPGA. For example, processor 31 may be implemented so as to include at least one of those hardware. By the hardware, a part or all of function blocks described below with reference to FIG. 4 and FIG. 5 may be realized.

The "DSP" is an abbreviation for "Digital Signal Processor", and "ASIC" is an abbreviation for "Application Specific Integrated Circuit". "PLD" is an abbreviation for "Programmable Logic Device", and "FPGA" is an abbreviation for "Field Programmable Gate Array".

(Function Configuration Example of Node 3)

Next, a functional configuration example of node 3 is described with reference to FIG. 4 and FIG. 5. FIG. 4 is a block diagram illustrating a functional configuration example illustrating node 3 according to one embodiment, and FIG. 5 is a block diagram illustrating a functional configuration example of a control section exemplified in FIG. 4.

Figure 4:
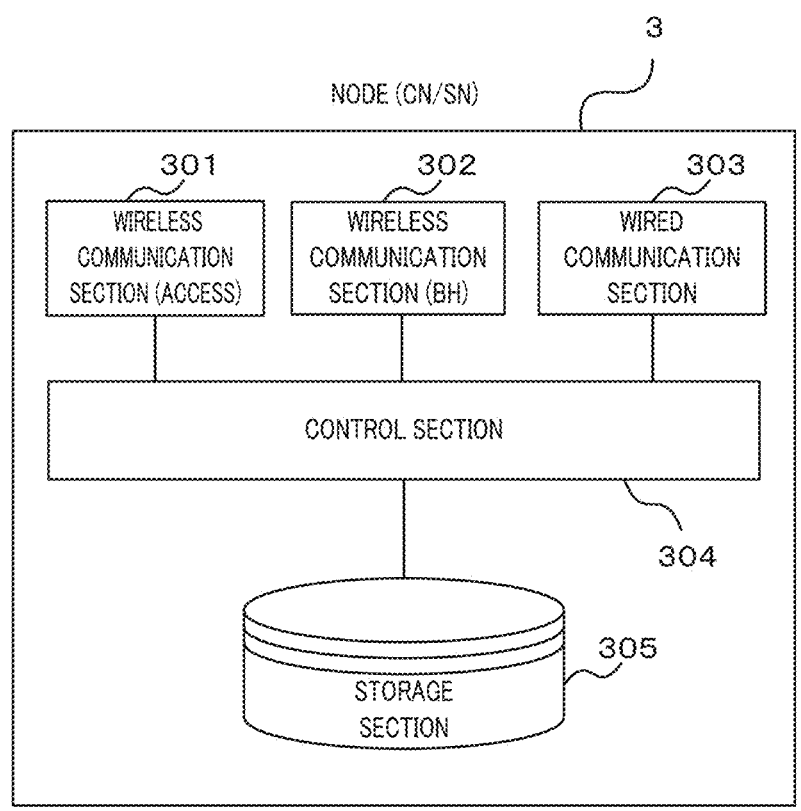
FIG. 4 is a block diagram illustrating a functional configuration example of the node according to one embodiment.

As illustrated in FIG. 4, upon focusing on the functional configuration, node 3 may include wireless communication section 301 for wireless access line, wireless communication section 302 for wireless BH line, wired communication section 303, control section 304, and storage section 305.

Wireless communication section 301 for wireless access line is a function block including wireless IF 35 and access line antenna 350 exemplified in FIG. 3. Wireless communication section 302 for wireless BH line is a function block including wireless IF 36 and BH line antenna 360 exemplified in FIG. 3.

Wired communication section 303 is a function block including wired IFs 37 and 39 exemplified in FIG. 3. Storage section 305 is a function block including one or both of memory 32 and storage 33 exemplified in FIG. 3.

Wireless communication section 301 may include a transmitting section that transmits a control signal and/or a data signal addressed to terminal apparatus 7, and a receiving section that receives the control signal and/or the data signal transmitted by terminal apparatus 7, for example.

Wireless communication section 302 may include a transmitting section that transmits a control signal and/or a data signal to a BH line linked up between node 3 and other node 3, and a receiving section that receives the control signal and/or the data signal from the linked up wireless link, for example.

Wired communication section 303 may include a transmitting section that transmits a control signal and/or a data signal to backbone network 5, and a receiving section that receives the control signal and/or the data signal from backbone network 5, for example.

Control section 304 comprehensively controls the operation of node 3. For example, control section 304 controls the communication via any one or more of the wireless access line, the wireless BH line, and the wired line by providing a control signal to any one or more of wireless communication section 301, wireless communication section 302, and wired communication section 303.

Control section 304 is implemented when processor 31 illustrated in FIG. 3 reads the program stored in storage section 305 and executes the read program, for example.

Storage section 305 stores therein the node identification information described above and a route metric described below, for example. As described below, when a transmission power value of transmission source node 3 is not included in the route construction packet, the transmission power value of transmission source node 3 may be stored in storage section 305.

(Configuration Example of Control Section 304)

Figure 5:
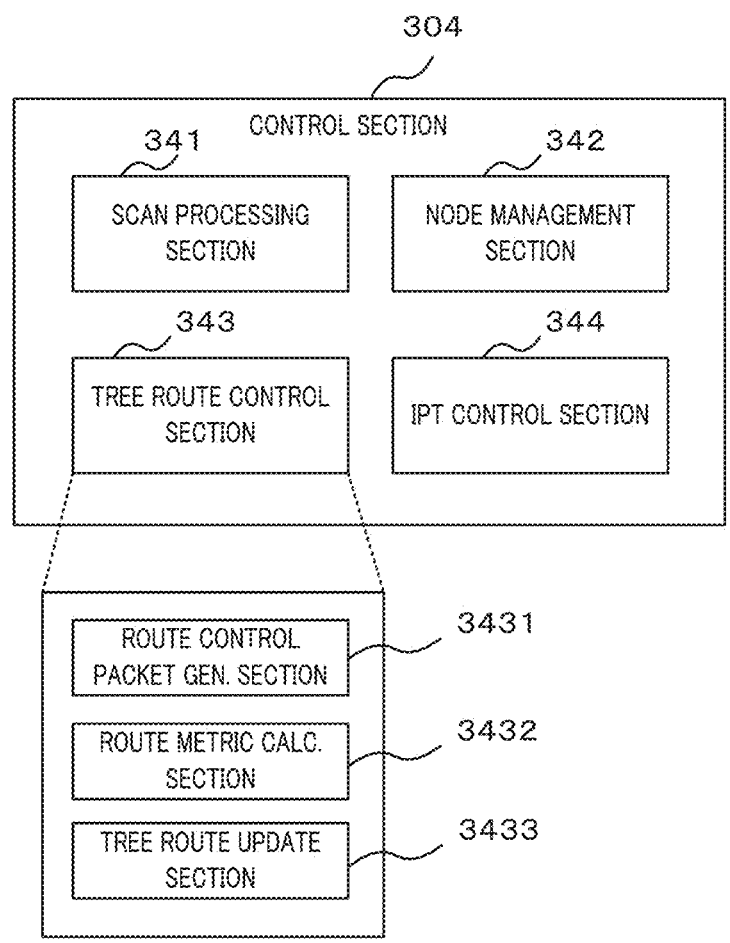
FIG. 5 is a block diagram illustrating a functional configuration example of a control section exemplified in FIG. 4.

As illustrated in FIG. 5, control section 304 may exemplarily include scan processing section 341, node management section 342, tree route control section 343, and IPT control section 344.

Scan processing section 341 scans and discovers the existence of other nodes 3 located in the periphery (or adjacency) of node 3 in accordance with the startup of node 3, for example. The scanning may be passive scanning or active scanning. When passive scanning is taken as an example, a beacon signal is generated in scan processing section 341 and is transmitted to a surrounding area through wireless communication section 302.

Node 3 that exists in a location in which a reception of the beacon signal is available may be referred to as "peripheral node 3" or "adjacent (or neighboring) node 3".

In the beacon signal, information explicitly or implicitly indicating a service set identifier (SSID) or a basic SSID (BSSID), the transmission period of the beacon signal, and the usable channel (frequency) may be exemplarily included. The information may be referred to as "basic service set (BSS) related information" for the sake of convenience.

In the case of active scanning, a probe request signal may be generated in scan processing section 341 and be transmitted to a surrounding area through wireless communication section 302. The probe request signal is used to prompt peripheral node 3 to transmit a beacon signal, for example. When a beacon signal is not received within a certain time period in the passive scanning, the active scanning may be executed.

Node management section 342 stores, for example, information (for example, node identification information and BSS related information) on peripheral node 3 discovered by the scanning performed by scan processing section 341 into storage section 305. In individual nodes 3, information (hereinafter may be abbreviated to "peripheral node information") on peripheral node 3 is stored in storage section 305. As a result, a mesh link that links nodes 3 to each other in a mesh topology by a plurality of wireless links is constructed in BH network 9 as described below.

The expression of "a mesh link is constructed" may be understood to mean that a plurality of wireless links are established or linked up among nodes 3 located in an area in which wireless communication is mutually possible. Therefore, the peripheral node information may be understood to indicate information on the wireless links usable among nodes 3. The "information on the wireless links" may be abbreviated to "link information" for the sake of convenience.

Tree route control section 343 controls the construction and update of the tree route on the mesh link by transmitting a route control packet in the mesh link. The construction and update of the tree route may be performed by selecting the information on the wireless link (or releasing the selection) to be registered with the tree route (or to be excluded from the tree route) among the plurality of wireless links forming the mesh link as described below, for example.

To "register" the wireless link with the tree route may be understood to mean to "select", "validate", "activate", or "enable" the link information to be registered with the tree route. To exclude the registered wireless link from the tree route may be understood to mean to "selection release", "invalidate", "deactivate", or "disable" the link information registered with the tree route.

IPT control section 344 controls the timing of packet transmission by wireless communication section 302 for BH line in accordance with the transmission period according to the frequency reuse interval, for example.

(Configuration Example of Tree Route Control Section 343)

As exemplified in FIG. 5, in tree route control section 343, route control packet generation section 3431, route metric calculation section 3432, and tree route update section 3433 may be included, for example.

Route control packet generation section 3431 generates a route control packet. The route control packet is one example of a control signal to be generated in CN 3 and propagated to each node 3 by designating CN 3 as the starting point in BH network 9.

For example, CN 3 floods each wireless link linked up in CN 3 with control signals. When SN 3 receives a control signal from any of the wireless links linked up in SN 3, SN 3 floods each of the wireless links linked up in SN 3 with the control signal. As described above, the control signal transmitted from CN 3 is propagated or sent through the mesh link sequentially or in a chained reaction.

CN 3 waits for an event that becomes a trigger for the transmission of the control signal until the event occurs while maintaining the linked up state of the wireless links. The event is described below with reference to FIG. 12 and the like. When the event occurs, CN 3 transmits the control signal using the wireless links of which linked up state is maintained.

Similarly, SN 3 waits for the arrival (reception) of the control signal while maintaining the linked up state of the wireless links between SN 3 and CN 3 or other SNs 3. When SN 3 receives the control signal from the wireless link in the linked up state, SN 3 transmits the control signal to other wireless links of which linked up state is maintained.

CN 3 and SN 3 may wait for the occurrence of an event and/or the reception of a control signal (for example, a route construction packet) in a state in which the linked up state of the wireless links forming the mesh link is maintained even after the tree route is constructed.

SN 3 may add information to be transmitted to other SNs 3 to the control signal to be sent to other wireless links of which linked up state is maintained. One non-limiting example of the information to be added to the control signal is a route metric calculated by route metric calculation section 3432. SN 3 may exclude the wireless links that have received the control signal among the wireless links linked up in SN 3 from the candidates for the transmission destination of the control signal. As a result, it is possible to suppress a case where the control signals are excessively or redundantly sent through the mesh link.

A route construction packet and a reset packet may be exemplarily included in the route control packet. The types of those packets may be identified in accordance with the type value of the packet header, for example.

The route construction packet is a packet that is transmitted when the tree route is constructed or updated, for example. In the route construction packet, the route metrics calculated in each of nodes 3 to which the route construction packet has been propagated may be cumulatively included. For example, node 3 may include the route metric from the core node to the node directly before its own node in the route construction packet and transmit the route construction packet.

SN 3 that has received the route construction packet selects the information on the wireless link to be registered with the tree route among the wireless links usable among peripheral nodes 3 forming the mesh link on the basis of the cumulative route metric.

The reset packet is a packet that is transmitted when CN 3 requests SN 3 to clear the tree route constructed in the mesh link, for example. SN 3 that has received the reset packet releases the selection of the information on the wireless link that is selected for the tree route.

Route metric calculation section 3432 calculates the propagation quality indicator of the wireless link between node 3 and peripheral node 3 that is the transmission source of the received route construction packet, and obtains a new route metric by adding the calculation result to the route metric included in the received route construction packet, for example.

A received signal strength indicator (RSSI) may be exemplarily used as the propagation quality indicator of the wireless link between nodes 3. For example, by expressing a series of values obtained by uniformly sampling the RSSI between nodes 3 at certain time intervals as $R_n$ (n is an integer that is equal to or more than 1), successive average (series) $A_n$ [dB] of the RSSI is obtained by Expression (1) below. Expression (1) is merely exemplified, and the successive average of the RSSI may be obtained using other expressions.

[Expression 1]

$$A_n = \begin{cases} R_1, & n = 1 \\ \dfrac{A_{n-1} \times (n-1) + R_n}{n}, & n = 2, 3, \ldots \end{cases} \quad (1)$$

Successive average $A_n$ expressed by Expression (1) converges to an average value of the stochastic process as the value of "n" increases. When it is understood that "n" expresses the number of times of the transmission (or the number of times of the reception) of the route construction packet after the reset packet is transmit (or received), for example, the successive average $A_n$ of the RSSI between nodes 3 converges to a certain value as the number of times n increases. Therefore, the tree route constructed by the transmission of the route construction packet asymptotically converges to a stable route.

Route metric calculation section 3432 may calculate, by Expression (2) below, a radio wave propagation loss (may be referred to as a "path loss") [dB] of the wireless link between node 3 and transmission source node 3 of the route construction packet, for example, using successive average $A_n$ of the RSSI calculated by Expression (1).

[Expression 2]

$$PathLoss = 10^{\frac{TXPower - RSSI}{10}} \quad (2)$$

In Expression (2), "TXPower" expresses the transmission power of transmission source node 3 of the mute construction packet. The transmission power value of transmission source node 3 may be stored in advance in storage section 305, for example, as a known value in individual nodes 3, or may be included in the route construction packet in transmission source node 3.

Route metric calculation section 3432 obtains a new route metric by adding the path loss calculated by Expression (2) to the cumulative route metric included in the received mute construction packet.

Therefore, the route metric indicates the sum of the path loss of the wireless links between CN 3 and one or more SNs 3. The route metric calculated every time the route construction packet is received is stored in storage section 305, for example. The route metric stored in storage section 305 may be initialized to a maximum value, for example, in accordance with the reception of the reset packet.

Tree route update section 3433 selects an upstream wireless link corresponding to the new route metric calculated by route metric calculation section 3432 in the peripheral node information as a valid tree route when the new route metric is smaller than the old route metric, for example.

For example, when route construction packets are received from different routes in SN 3, the route metrics of one or more wireless links through which the route construction packets have been propagated are calculated in route metric calculation section 3432 for the different routes.

Tree route update section 3433 selects a wireless link corresponding to one of the different routes from which the route construction packet are received among the wireless links linked up in SN as a route to be used in the transmission of the data signal on the basis of the route metrics calculated for the different routes.

The tree route constructed in mesh link is a tree structure, and hence the number of upstream nodes 3 for individual SNs 3 is always one. Therefore, tree route update section 3433 is available to construct or update the tree route depending on whether the wireless link (link information) between node 3 and upstream node 3 in the mesh link is selected as the wireless link to be registered with the tree route or the selection is released, for example.

Therefore, tree route update section 3433 is one example of a selecting section that selects one of the wireless links linked up in SN 3 as the tree route, and is also one example of a releasing section that releases the selection.

As described above, a feature in which each of SNs 3 selects a wireless link between SN 3 and upstream node 3 may be understood to be equivalent to selecting one of the wireless links linked up (forming a mesh link) in SN 3 as the transmission route of the data signal.

Alternatively, a feature in which each of SNs 3 selects a wireless link between SN 3 and upstream node 3 may be understood to be equivalent to selecting at least some of the plurality of wireless links linked up between plurality of nodes 3 as elements (components) of a wireless link set forming a tree route having a predetermined node (for example, CN 3) on the top.

In each of SNs 3, the selection and the release of the wireless link (in other words, the update of the wireless link to be selected as the tree route) is performed in accordance with the change of the route metric calculated each time a route construction packet is received. Therefore, the update frequency of the tree route may be changed by changing the number of times of the transmission of the route construction packet by CN 3 per unit time period.

For example, as the radio wave propagation environment of BH network 9 is a more easily changed environment, it is possible to improve the performance of tracking the change in the radio wave propagation environment of BH network 9 by increasing the number of times of the transmission of the route construction packet by CN 3 per unit time period.

The wireless link between node 3 and downstream node 3 may be grasped by an acknowledgement (ACK) signal received from downstream node 3 after the downlink route is constructed, for example. For example, downstream node 3 transmits (unicasts) the ACK signal to parent node 3 that is the transmission source of the route construction packet when downstream node 3 updates the route metric by receiving the route construction packet. In the ACK signal to be unicasted, information on the wireless link in the linked up state stored and managed in downstream node 3 that is the transmission source of the ACK signal may be included, for example. Parent node 3 is available to determine the downlink wireless link to be selected as and registered with the tree route by receiving the ACK signal from downstream node 3.

<Operation Example>

An operation example of wireless communication system 1 described above is described below.

(Link Setup Procedure)

Figure 6:
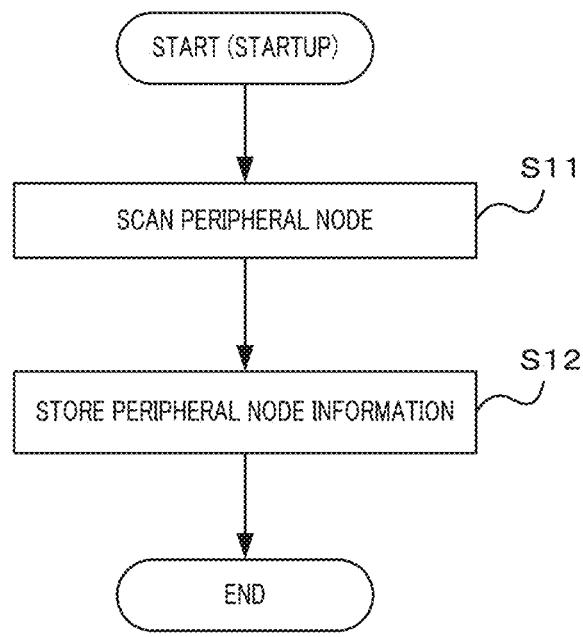
FIG. 6 is a flowchart illustrating one example of a procedure of setting up a link between the nodes according to one embodiment.

FIG. 6 is a flowchart illustrating one example of a procedure of setting up a link between nodes 3 (in other words, the wireless BH line in BH network 9) according to one embodiment.

As exemplified in FIG. 6, in BH network 9, each of nodes 3 including CNs and SNs scan nodes (hereinafter may be referred to as "peripheral nodes") 3 existing in the periphery by an IBSS mode, for example, in accordance with the startup (S11).

"IBSS" is an abbreviation for "Independent Basic Service Set". The IBSS mode may be referred to as an ad hoc mode. In the "startup" of node 3, the operation of turning ON the power supply of node 3 and the reboot of node 3 performed by resetting may be included.

For example, in scanning processing S11, each of nodes 3 starts the transmission of the beacon signal to the surrounding area in accordance with the startup. The beacon signal is generated in scan processing section 341 of control section 304 and is transmitted from BH line antenna 360 (wireless communication section 302), for example.

In scanning processing S11 in the IBSS mode, nodes 3 that have started up may transmit the beacon signals by turns (for example, at timings that are pseudo-randomly managed in nodes 3) in order to avoid the collision between the beacon signals.

Node 3 that has received a beacon signal transmitted by other node 3 stores information included in the received beacon signal in storage section 305, for example (S12). The transmission and reception of the beacon signal may be performed for each channel (in other words, usable channel) operated by node 3.

Therefore, scanning processing (S11) may be referred to as "channel scanning". Node 3 that has received the beacon signal may suspend the transmission of the beacon signal for the channel through which the beacon signal is received.

Each of nodes 3 stores therein the BSS related information included in the beacon signal that has been able to be received from other node 3, and hence it is possible to manage information (hereinafter may be referred to as "peripheral node information") on peripheral node 3 with which communication is available by the wireless link.

Figure 7:
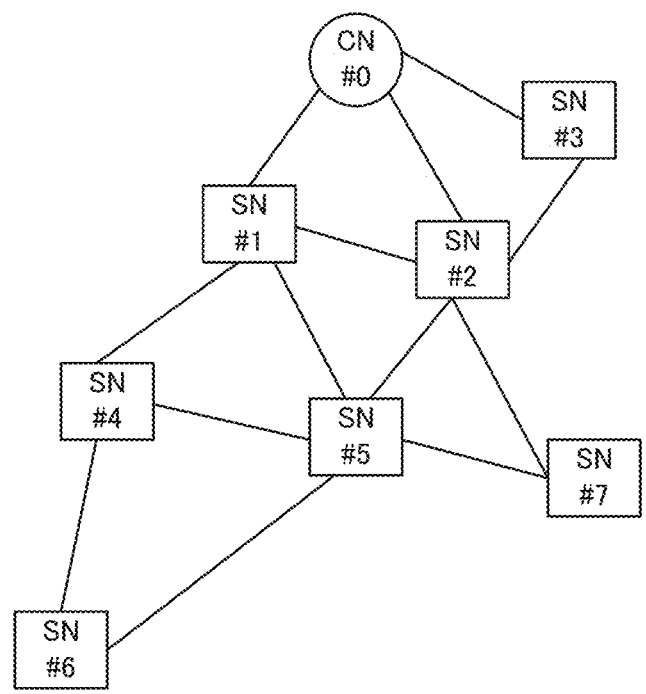
FIG. 7 illustrates an example in which wireless links are linked up between the nodes in a mesh topology by the procedure of setting up a link exemplified in FIG. 6.

Individual nodes 3 store therein and manage the peripheral node information, and hence the usable wireless links (may be replaced with "channels") are managed in as illustrated in FIG. 7, for example. As a result the link setup of the wireless BH lines is finished, and the mesh links are linked up in BH network 9.

FIGS. 8A to 8H each illustrate one example of peripheral node information managed in each of nodes #0 to #7 exemplified in FIG. 7.

FIG. 8A illustrates that node IDs #1 to #3 are stored and managed in node (CN)#0, and CN #0 is in a state of being able to use the wireless links between CN #0 and each of SNs #1 to #3.

FIG. 8B illustrates that node IDs #0, #2, #4, and #5 are stored and managed in SN #1, and SN #1 is in a state of being able to use the wireless links between SN #1 and each of nodes #0, #2, #4, and #5.

FIG. 8C illustrates that node IDs #0, #1, #3, #5, and #7 are stored and managed in SN #2, and SN #2 is in a state of being able to use the wireless links between SN #2 and each of nodes #0, #1, #3, #5, and #7.

FIG. 8D illustrates that node IDs #0 and #2 are stored and managed in SN #3, and SN #3 is in a state of being able to use the wireless links between SN #3 and each of nodes #0 and #2.

FIG. 8E illustrates that node IDs #1, #5, and #6 are stored and managed in SN #4, and SN #4 is in a state of being able to use the wireless links between SN #4 and each of nodes #1, #5, and #6.

FIG. 8F illustrates that node IDs #1, #2, #4, #6, and #7 are stored and managed in SN #5, and SN #5 is in a state of being able to use the wireless links between SN #5 and each of nodes #1, #2, #4, #6, and #7.

FIG. 8G illustrates that node IDs #4 and #5 are stored and managed in SN #6, and SN #6 is in a state of being able to use the wireless links between SN #6 and each of nodes #4 and #5.

FIG. 8H illustrates that node IDs #2 and #5 are stored and managed in SN #7, and SN #7 is in a state of being able to use the wireless links between SN #7 and each of nodes #2 and #5.

As described above, a mesh-like wireless link using the IBSS mode between nodes 3 is formed (or constructed). The mesh-like wireless link constructed using the IBSS mode as described above may be referred to as an IBSS mesh link.

(Tree Route Control over IBSS Mesh Link)

Next, the tree mute control on the IBSS mesh link is described.

Figure 9A:
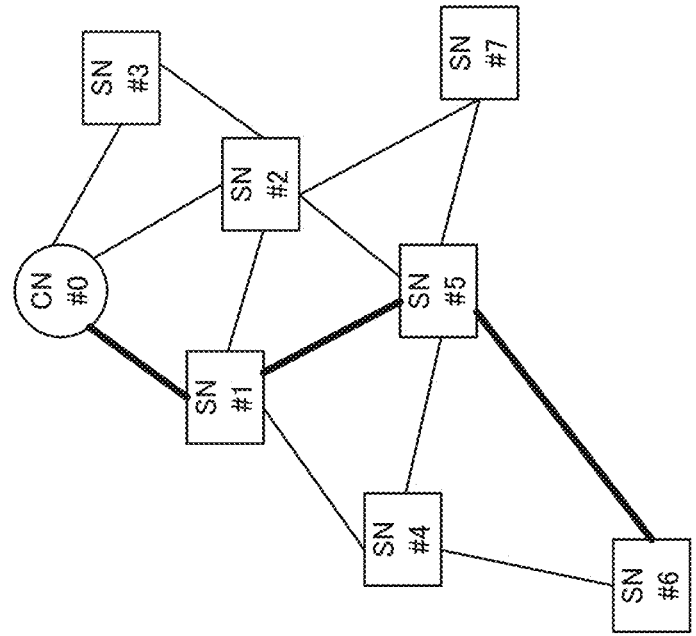
FIGS. 9A and 9B each illustrate one example of tree route control on a mesh link according to one embodiment.
Figure 9B:
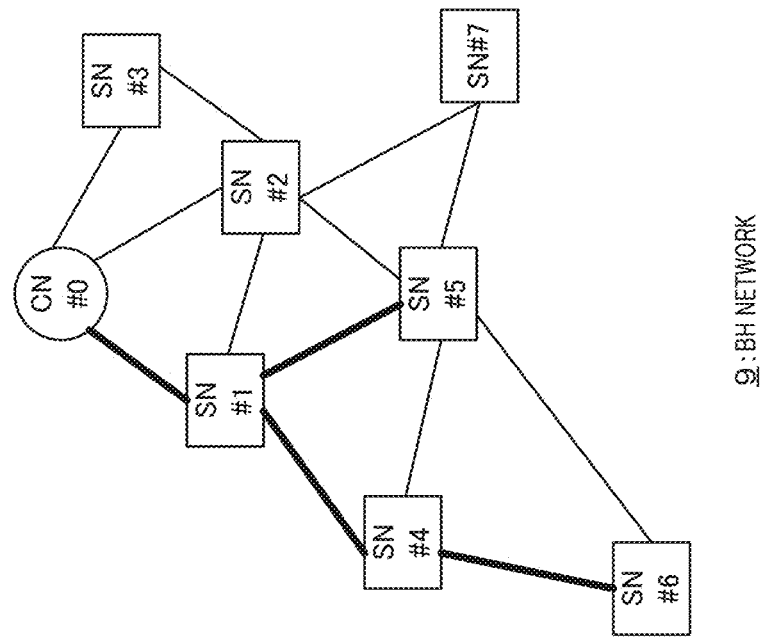

FIGS. 9A and 9B each illustrate one example of the tree route control on the IBSS mesh link according to one embodiment.

FIG. 9A illustrates an example in which a tree topology indicated by a thick solid line is constructed by CN #0, SN #1, SN #4, SN #5, and SN #6 by the tree route control in the IBSS mesh link exemplified in FIG. 7.

FIG. 9B illustrates an example in which a tree topology indicated by a thick solid line is constructed by CN #0, SN #1, SN #5, and SN #6 by the tree route control in the IBSS mesh link exemplified in FIG. 7.

FIGS. 9A and 9B may be understood to be illustrating how the tree topology changes on the IBSS mesh link between FIGS. 9A and 9B through time by the tree route control performed at different times.

Now, in the tree route control as exemplified in FIGS. 9A and 9B, the IBSS mesh link is already linked up. Therefore, it is possible to realize the tree route control by selecting the link information corresponding to the wireless links validated as the tree route in the peripheral node information depicted in FIGS. 8A to 8H, for example.

As one non-limiting example, FIGS. 10A to 10H and FIGS. 11A to 11H illustrate selection examples of the link information in CN #0 and SNs #1 to #7 so as to correspond to the tree routes exemplified in FIGS. 9A and 9B. In FIGS. 10A to 10H and FIGS. 11A to 11H, information depicted with hatching corresponds to the link information selected as the tree route. The information depicted in FIGS. 10A to 10H and FIGS. 11A to 11H corresponds to the information exemplified in FIGS. 8A to 8H.

For example, the tree route illustrated in FIG. 9A is constructed by selecting the link information depicted with hatching in FIGS. 10A, 10B, 10E, and 10F in nodes #0, #1, #4, #5, and #6.

Meanwhile, the tree route illustrated in FIG. 9B is constructed by selecting the link information depicted with hatching in FIGS. 11A, 11B, and IF in nodes #0, #1, #5, and #6.

The link information is selected by control section 304 (for example, tree route update section 3433 of tree route control section 343).

As described above, it is possible to speed up the construction and update of the tree route by changing (or switching) the link information selected based on the route metric by individual nodes 3 in a mesh link that is linked up between nodes 3 in advance. In other words, it is possible to improve the performance of tracking the change of the tree route in accordance with the temporal change of the route metric.

For example, processing (for example, takes a few seconds) relating to association and/or authentication between nodes 3 does not necessarily need to be performed every time the tree route changes, and hence it is possible to improve the performance of tracking the temporal change of the tree route.

Here, "the temporal change of the route metric" is due to "the temporal change of the wireless environment" in BH network 9, in other words, "the temporal change of the BH line quality". Therefore, in the "adaptive tree route control" of this embodiment, it is possible to improve the performance of tracking the temporal change of the BH line quality. Therefore, it is possible to suppress the occurrence of communication disconnection associated with the change of the tree route in the wireless BH line, and the uninterrupted communications are realized easily.

(Operation Example of CN)

Figure 12:
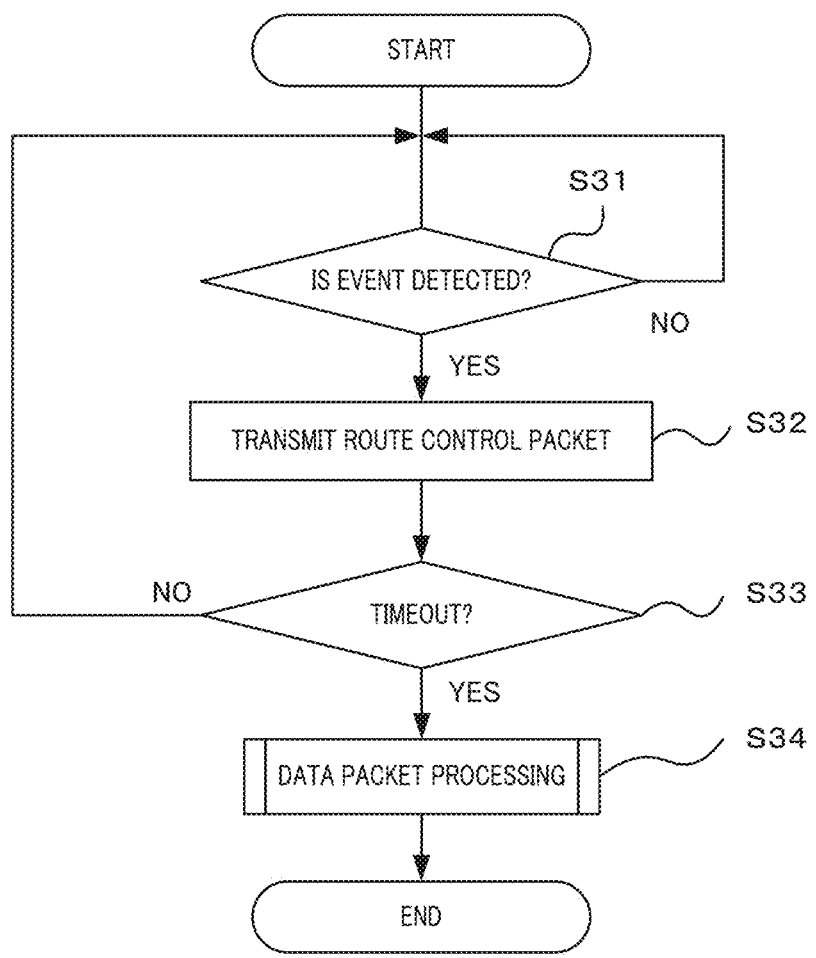
FIG. 12 is a flowchart illustrating an operation example of a core node (CN) including the tree route control on the mesh link according to one embodiment.

FIG. 12 is a flowchart illustrating the operation example of CN 3 including the tree route control on the IBSS mesh link according to one embodiment. The flowchart in FIG. 12 may be understood to be executed in control section 304 (for example, tree route control section 343) in CN 3.

As illustrated in FIG. 12, control section 304 of CN 3 monitors whether a predetermined event is detected, for example (S31; NO). In the "predetermined event", an event in which CN 3 has started up, an event in which the reset button has been operated, and an event in which a predetermined timing has come may be included, for example. One example of the "predetermined timing" is a transmission timing set in order to regularly or irregularly transmit a route control packet, for example.

The transmission period when the route control packet is regularly transmitted may be fixed or may be changed in accordance with the number of times the flowchart in FIG. 12 is executed because the tree route constructed in this embodiment is asymptotically stable. A predetermined time of day may be set as the "predetermined timing" so that the tree route is updated in accordance with weekends and time zones such as nighttime and daytime of a day, for example.

When a predetermined event is detected (S31; YES), control section 304 of CN 3 generates a route control packet, and transmits (broadcasts) the route control packet to peripheral SN 3 identified on the basis of peripheral node information through wireless communication section 302, for example (S32).

For example, when the startup of CN 3 is detected and when the transmission timing of the route construction packet is detected, route construction packet is transmitted to peripheral SN 3. When the operation of the reset button is detected and when the transmission timing of the reset packet is detected, the reset packet is transmitted to peripheral SN 3.

After the route control packet is transmitted, control section 304 monitors whether a certain time period has elapsed (timeout), for example (S33). When a timeout is not detected (S33; NO), control section 304 may cause the processing to proceed to processing S31.

Meanwhile, when the elapse of a certain time period is detected (S33; YES), control section 304 may start the transmission of the data packet (S34). The transmission of the data packet is performed in accordance with the IPT as described below in FIG. 14 and FIG. 15, for example.

As described above, CN 3 propagates the route control packet to each of SNs 3 forming BH network 9 by transmitting (broadcasting) the route control packet to each of the plurality of wireless links linked up between CN 3 and peripheral nodes 3. As a result, in BH network 9 in which a mesh link is linked up, it is possible to speed up the construction and update of the tree route based on the route metric. Therefore, it is possible to improve the performance of tracking the change of the tree route in accordance with the temporal change of the route metric.

(Operation Example of SN)

Figure 13:
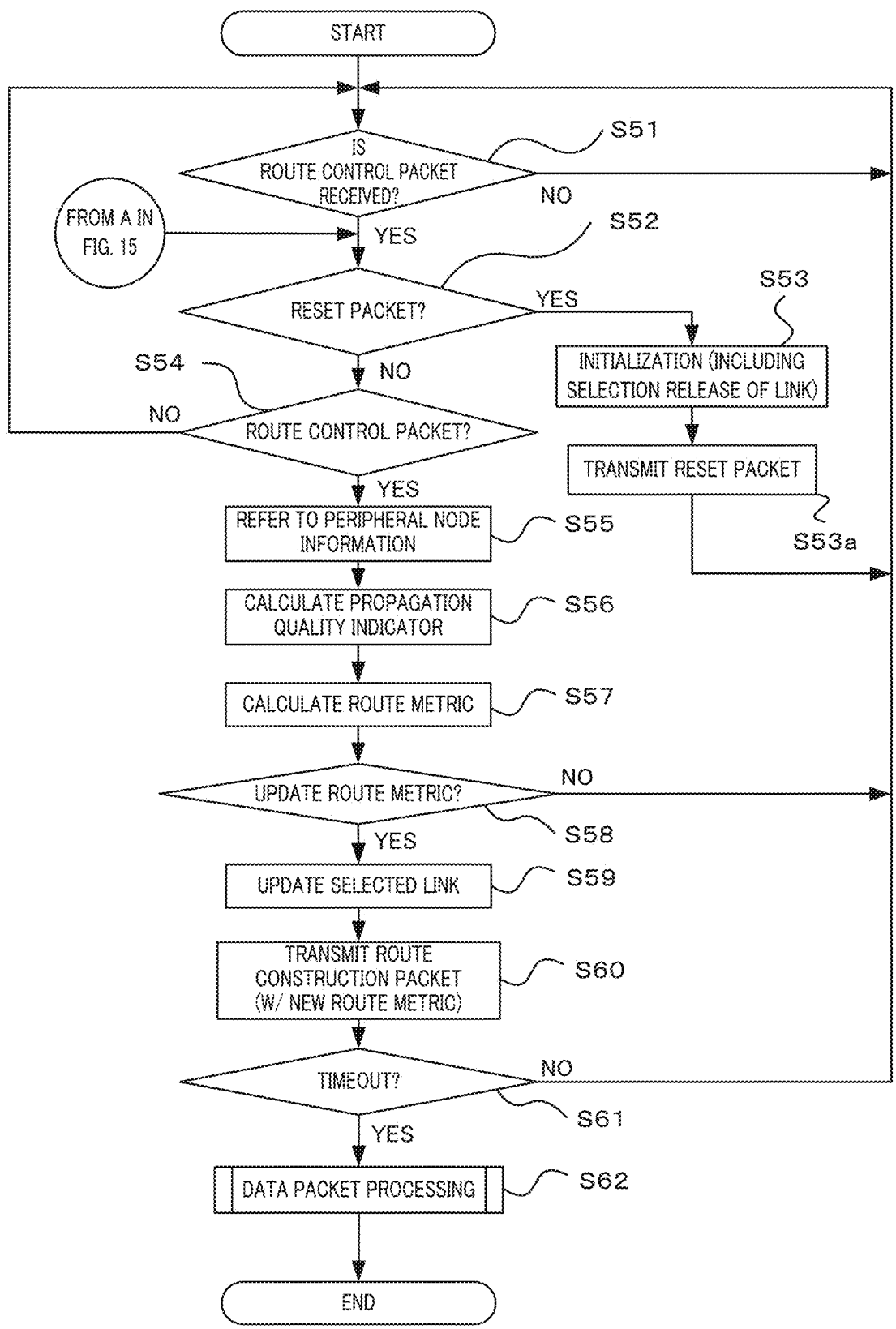
FIG. 13 is a flowchart illustrating an operation example of a slave node (SN) including the tree route control on the mesh link according to one embodiment.

Next, the operation example of SN 3 is described with reference to FIG. 13. FIG. 13 is a flowchart illustrating the operation example of SN 3 including the tree route control on the IBSS mesh link according to one embodiment. The flowchart in FIG. 13 may be understood to be executed in control section 304 (for example, tree route control section 343) of SN 3.

SN 3 monitors whether a route control packet is received in wireless communication section 302, for example (S51; NO).

When the reception of the route control packet is detected (S51; YES), control section 304 of SN 3 checks the type of the route control packet. For example, control section 304 checks whether the received route control packet is a reset packet or a route construction packet (S52 and S54).

When the received route control packet is a reset packet (S52; YES), control section 304 performs initialization processing (S53). The processing below may be included in the initialization processing, for example.

The selection release of the link selected as a valid tree mute in peripheral node information The initialization of the stored route metric to an initial value (for example, the maximum value)

After the initialization processing, control section 304 transmits (floods) the received reset packet to peripheral SN 3, for example (S53a). An identifier (ID) may be included in the reset packets. Each of nodes 3 may store therein the ID included in the received reset packet.

When the ID of the received reset packet matches with the stored ID, in other words, when the ID of the received reset packet indicates that the packet is a reset packet that has been transmitted (transferred) in the past, each of nodes 3 does not perform further transmission of the reset packet. As a result, the looping of the reset packet in BH network 9 may be prevented.

Meanwhile, when the received route control packet is not a reset packet (S52; NO), control section 304 checks whether the route control packet is a route construction packet (S54).

When the received route control packet is a route construction packet (S54; YES), control section 304 refers to the peripheral node information (S55), and calculates the propagation quality indicator (for example, the radio wave propagation loss) of the link through which the route construction packet is received (S56).

Control section 304 calculates the route metric on the basis of the calculated radio wave propagation loss (S57). For example, control section 304 calculates the cumulative radio wave propagation loss as a new route metric by adding the calculated radio wave propagation loss and the propagation quality indicator included in the received route construction packet.

Then, control section 304 determines whether the update of the route metric is necessary by comparing the new route metric and the old route metric that is stored before the new route metric is calculated (S58).

For example, control section 304 determines that the old route metric is to be updated to the new route metric when the new route metric is smaller than the old route metric (S58; YES). In accordance with the determination, control section 304 selects an upstream wireless link corresponding to the new route metric in the peripheral node information as the valid tree route (the update of the selected link; S59).

Control section 304 transmits (broadcasts) the route construction packet including the new route metric to peripheral SN 3 identified in the peripheral node information, for example, in accordance with the update of the selected link (S60).

Then, control section 304 monitors whether a certain time period has elapsed (timeout) (S61). When a timeout is not detected (S61; NO), control section 304 may cause the processing to proceed to the processing of monitoring the reception of the route control packet (S51). When the timeout is detected (S61; YES), control section 304 may start the processing of transmitting the data packet in accordance with the IPT, for example (S62).

When the received route control packet is neither a reset packet nor a route construction packet (S52 and S54; NO), control section 304 may cause the processing to proceed to the processing of monitoring the reception of the route control packet (S51).

Also when the calculated new route metric is equal to or more than the old route metric and it is determined that the update of the selected link is unnecessary (S58; NO), control section 304 may cause the processing to proceed to the processing of monitoring the reception of the route control packet (S51).

As described above, SN 3 selects one of the plurality of wireless links linked up between SN 3 and peripheral node 3 on the basis of the route metric in accordance with the reception of the route construction packet. As a result, in BH network 9 in which a mesh link is linked up, it is possible to speed up the construction and update of the tree route based on the route metric. Therefore, it is possible to improve the performance of tracking the change of the tree route in accordance with the temporal change of the route metric.

(IPT in Tree Route)

Next, the operation example of node 3 when the data packet is transmitted by the IPT in the tree route constructed by the tree route control described above is described with reference to FIG. 14 and FIG. 15.

Figure 14:
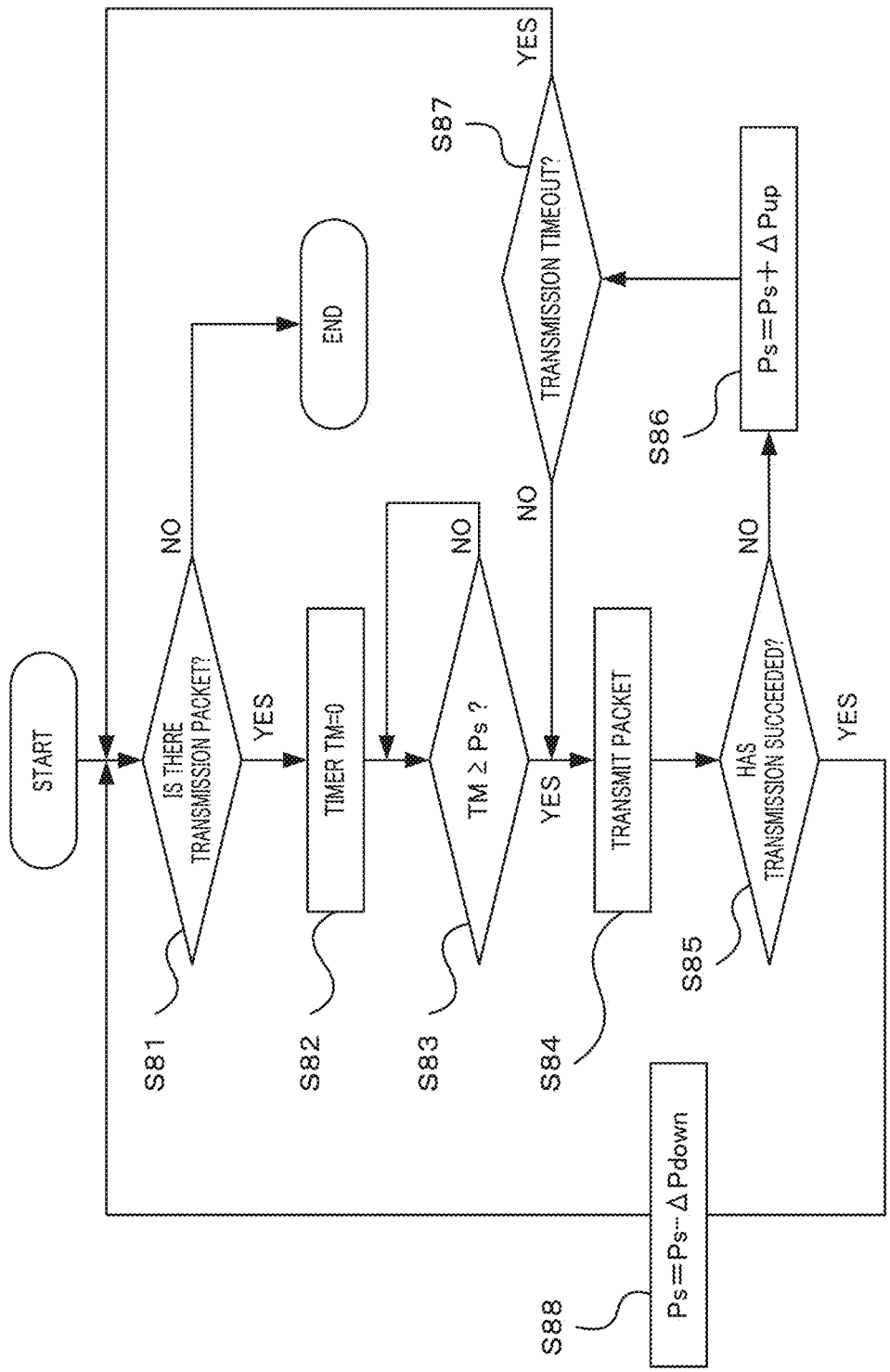
FIG. 14 is a flowchart illustrating an operation example of the CN when a data packet is transmitted in the tree route constructed by the tree route control exemplified in FIGS. 9A and 9B.
Figure 15:
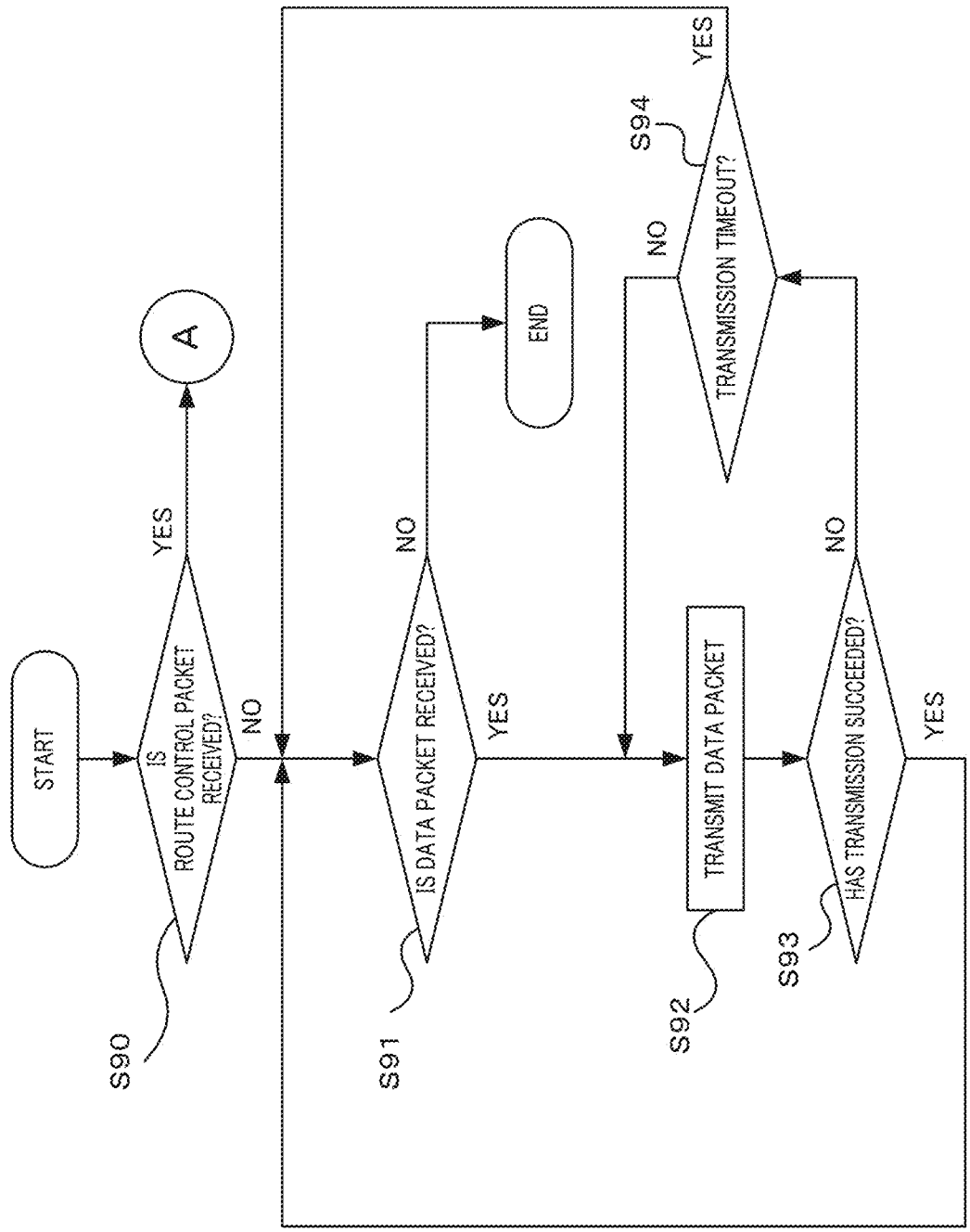
FIG. 15 is a flowchart illustrating an operation example of the SN when the data packet is transmitted in the tree route constructed by the tree mute control exemplified in FIGS. 9A and 9B.

The flowchart exemplified in FIG. 14 may be understood to be executed in processing S34 of CN 3 illustrated in FIG. 12, for example. Meanwhile, the flowchart exemplified in FIG. 15 may be understood to be executed in processing S62 of SN 3 illustrated in FIG. 13, for example. The flowcharts in FIG. 14 and FIG. 15 are executed in control sections 304 (for example, IPT control sections 344) of CN 3 and SN 3, respectively.

(Operation Example of CN)

As exemplified in FIG. 14, CN 3 monitors whether there is a downlink packet in a transmission buffer, for example (S81).

When there is a downlink packet in the transmission buffer (S81; YES), CN 3 sets timer TM to an initial value (for example, 0) (S82), and waits for the packet transmission while the count value of timer TM is less than transmission period Ps (S83; NO). Meanwhile, when there is no downlink packet in the transmission buffer (S81; NO), CN 3 may end the processing relating to the packet transmission.

Timer TM may be included in IPT control section 344, for example. The transmission buffer is one example of a memory that temporarily stores therein a packet to be transmitted to the wireless BH line, and may be included in wireless communication section 302 for wireless BH line or may be embodied in storage section 305. In any case, the transmission buffer only needs to be able to be accessed by control section 304, and the writing and the read out of the packet only need to be possible by the access. Those features also apply to SN 3.

When the count value of timer TM becomes equal to or more than transmission period Ps (S83; YES), the downlink packet in the transmission buffer is transmitted from wireless communication section 302 (S84). When there are a plurality of downlink packets, CN 3 may transmit the plurality of downlink packets in succession.

After the downlink packet is transmitted, CN 3 determines whether the transmission of the downlink packet has succeeded (S85). Whether the transmission of the packet has succeeded may be detected by whether an acknowledgement (ACK) signal is received from a reception partner of the packet within a certain time period. In CN 3, the reception of the ACK signal may be determined as an event indirectly (implicitly) indicating that the frequency reuse interval is satisfied.

When the reception of the ACK signal for the downlink packet is not detected within a certain time period (S85; NO), CN 3 determines that transmission period Ps is not appropriate (for example, too short) and increases transmission period Ps by ΔPup, for example (S86). The detection of the reception of a negative acknowledge (NACK) signal may be included in the detection indicating that the ACK signal is unreceived.

Then, CN 3 determines whether a specified time period in which the packet transmission is allowed has elapsed (whether a transmission timeout has been detected) (S87). When the transmission timeout is not detected (S87: NO). CN 3 may resend the downlink packet of which ACK signal has not been able to be received in processing S84.

Meanwhile, when the transmission timeout is detected (S87; YES), CN 3 discards the packet of which ACK signal has not been able to be received, returns the processing to processing S81, and monitors whether there is a downlink packet.

When the transmission of the downlink packet has succeeded (S85; YES), CN 3 determines that transmission period Ps may be shortened, and reduces transmission period Ps by ΔPdown, for example (S88). Then, CN 3 returns the processing to processing S81, and monitors whether there is a downlink packet.

As described above, transmission period Ps according to an appropriate frequency reuse interval is set in CN 3 by dynamically adjusting transmission period Ps in accordance with whether the transmission of the downlink packet has succeeded.

Transmission period Ps is variable in the example described above, but transmission period Ps may be a fixed value. In other words, a feature in which transmission period Ps is variable may be optional. For example, in FIG. 14, the processing illustrated in processing S86 and processing S88 may be omitted.

The value of transmission period Ps may be set to "0". For example, in a network having a low number of hops that is about several hops, efficient packet transmission is possible by a packet collision avoiding function in layer 2 and below such as carrier sense multiple access/collision avoidance (CSMA/CA) without using a special packet transmission control. Therefore, for example, when each node 3 includes a packet collision avoiding function in layer 2 and below such as CSMA/CA, "Ps=0" may be set.

(Operation Example of SN)

As exemplified in FIG. 15, SN 3 monitors whether the route control packet is received, for example (S90). The flowchart in FIG. 15 may be common to the processing of packet transmission to the downstream line and the upstream line.

When a route control packet is received (S90; YES), SN 3 causes the processing to proceed to processing S52 in FIG. 13. Meanwhile, when the reception of a route control packet is not detected (S90; NO), SN 3 monitors whether a data packet to be transmitted (relayed) to the downstream line and/or the upstream line is received (S91).

When a data packet is received (S91; YES), SN 3 transmits the received data packet from wireless communication section 302 (S92). When a plurality of data packets are received. SN 3 may transmit the plurality of received data packets in succession.

After the data packet is transmitted, SN 3 determines whether the transmission of the data packet has succeeded (S93). When the reception of the ACK signal for the data packet is not detected within a certain time period (S93; NO), SN 3 determines whether a specified time period in which the transmission of the data packet is allowed has elapsed (whether a transmission timeout is detected), for example (S94). When a transmission timeout is not detected (S94; NO), SN 3 may resend the data packet of which ACK signal is not received in processing S92.

Meanwhile, when a transmission timeout is detected (S94; YES), SN 3 discards the data packet of which ACK signal is not received, returns the processing to processing S91, and waits for (monitors) the reception of the data packet to be relayed and transmitted.

When the transmission of the data packet has succeeded (S93; YES), SN 3 returns the processing to processing S91 and waits for (monitors) the reception of the data packet to be relayed and transmitted.

When the reception of a data packet is not detected in processing S91, SN 3 may end the processing. Alternatively, when the reception of a data packet is not detected in processing S91, SN 3 may return the processing to processing S90.

By the combination of the "adaptive tree route control" and the "IPT control" described above, the data packet is transmitted and received in a time division multiplexing in periods according to the frequency reuse interval in the tree route that changes so as to adaptively track the change of the wireless environment.

Therefore, it is possible to achieve an adaptive time division multiple access (TDMA) or a time division duplex (TDD) with high tracking performance in the quality change of the wireless BH line.

(Variation)

In the embodiment described above, an example in which the IBSS mesh link as exemplified in FIG. 7 is formed with use of the IBSS mode of nodes 3 is described. However, a case where nodes 3 do not support the IBSS mode is also possible.

When nodes 3 do not support the IBSS mode, a mesh link equivalent to the IBSS mesh link as that exemplified in FIG. 7 may be constructed by a combination of an access point (AP) mode and a station (STA) mode, for example.

Figure 16C:
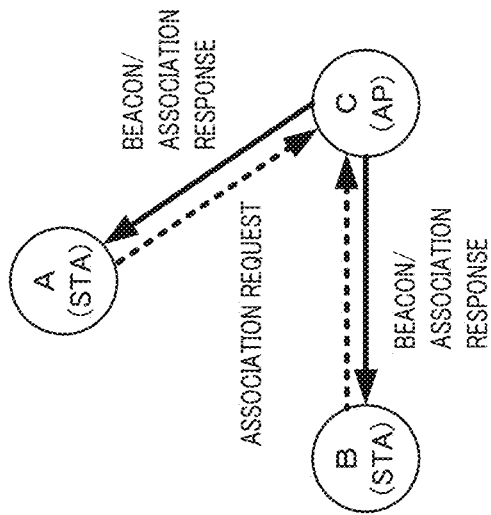
FIGS. 16A, 16B, and 16C each illustrate one example of a setup procedure of the mesh link between the nodes using a combination of an access point (AP) mode and a station (STA) mode according to a variation of one embodiment.
Figure 16A:
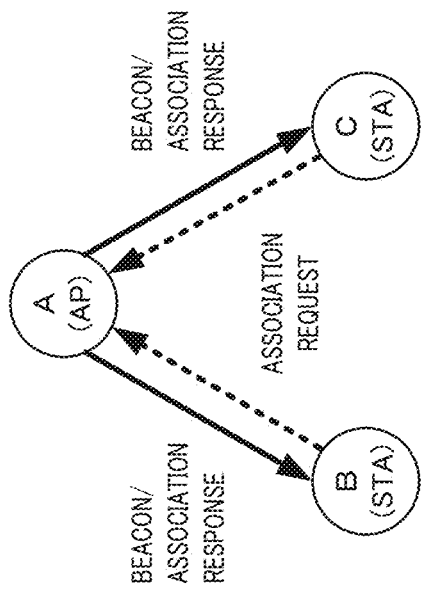
Figure 16B:
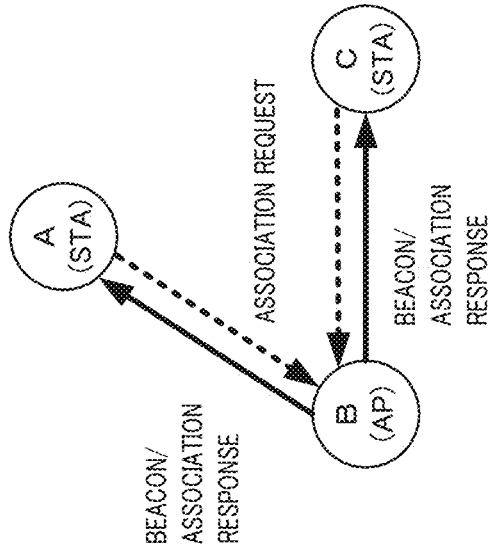

In FIGS. 16A, 16B, and 16C, an example in which a mesh link is constructed between nodes 3 with use of a combination (may be referred to as "hybrid") of the AP mode and the STA mode is illustrated. The combination of the AP mode and the STA mode is referred to as a "pseudo IBSS mode" for the sake of convenience.

Figure 17:
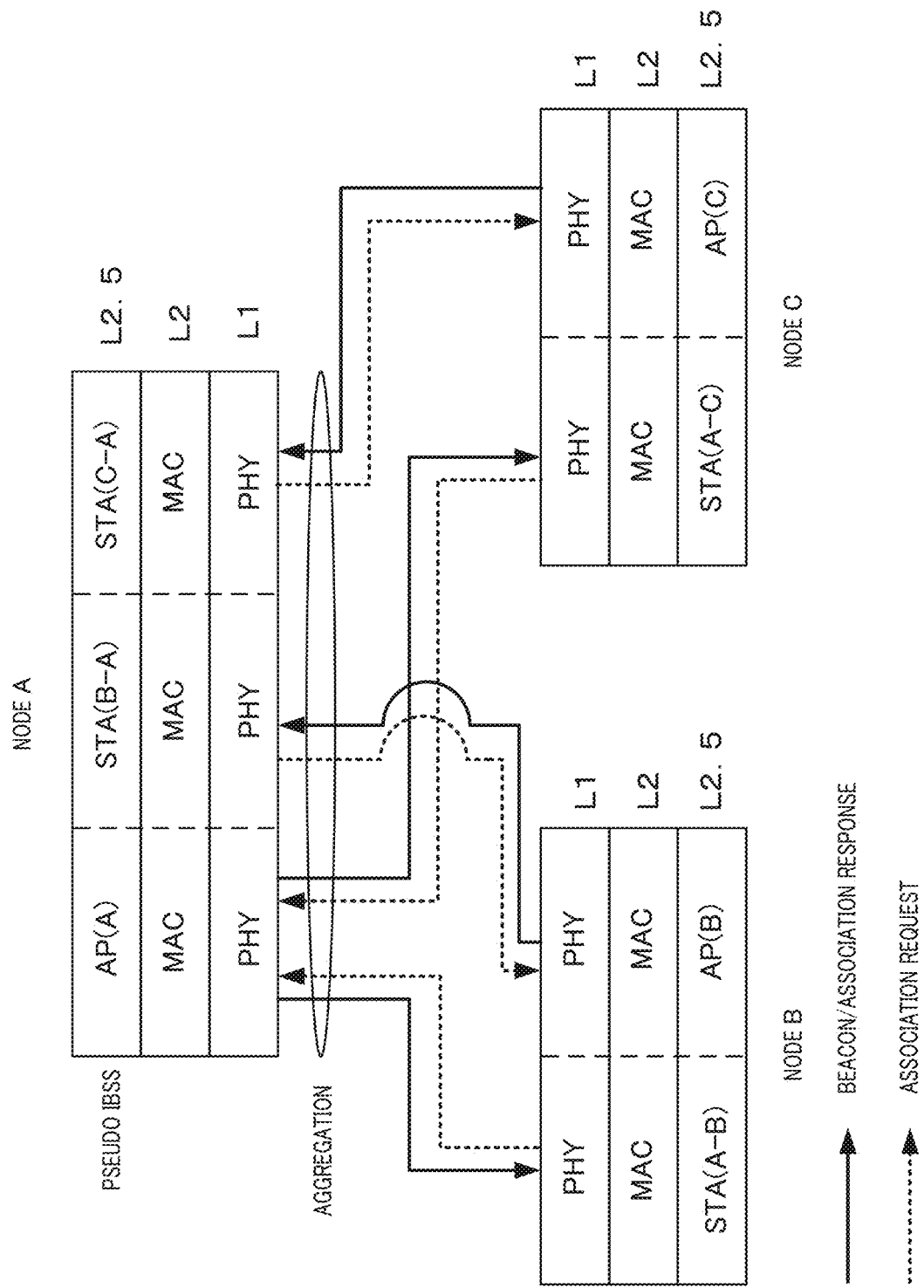
FIG. 17 illustrates the setup procedures of the mesh links exemplified in FIGS. 16A, 16B, and 16C together with protocol stacks of the nodes.

In FIGS. 16A to 16C, three nodes A, B, and C are exemplarily illustrated. In FIG. 17, one example of a setup procedure of the wireless link using the pseudo IBSS mode between nodes A and B and between nodes A and C is illustrated together with the protocol stacks of nodes A to C.

For example, as illustrated in FIG. 16A, node A transmits beacon signals to the periphery in accordance with the operation of the AP (mode) in response to the startup. Peripheral nodes B and C that have received the beacon signals transmit association requests to node A in accordance with the operation of the STA (mode).

When node A approves the association requests received from peripheral nodes B and C, node A transmits association responses addressed to peripheral nodes B and C in accordance with the operation of the AP. As a result, a wireless link of multi-points (nodes B and C) in which node A is the starting point (AP) is linked up.

Similarly, for example, as illustrated in FIG. 16B, node B transmits beacon signals to the sorround in accordance with the operation of the AP (mode) in response to the startup. Peripheral nodes A and C that have received the beacon signals transmit association requests to node B in accordance with the operation of the STA (mode). As a result, a wireless link of multi-points (nodes A and C) in which node B is the starting point (AP) is linked up.

Upon focusing on node C, as illustrated in FIG. 16C, node C transmits beacon signals to the surround in accordance with the operation of the AP (mode) in response to the startup. Peripheral nodes A and B that have received the beacon signals transmit association requests to node C in accordance with the operation of the STA (mode). As a result, a wireless link of multi-points (nodes A and B) in which node C is the starting point (AP) is linked up.

When the operation examples above are summarized, nodes A, B, and C operate in the AP mode as transmission sources of beacon signals, and operate in the STA mode in the relationship with the peripheral nodes when nodes A, B, and C receive beacon signals of which transmission sources are other peripheral nodes.

In FIG. 17, the operation examples above are schematically illustrated together with the protocol stacks of nodes A, B, and C. In FIG. 17, for the convenience of description, each of physical layer (L1) and MAC layer (L2) in same node 3 is visualized by dividing the layer into the AP mode and the STA mode.

However, L1 and L2 may be common to the AP mode and the STA mode. For example, L1 and L2 may be realized by the same hardware, and wireless communication according to the AP mode and the STA mode may be multiplexed for the same channel with use of multiplexing methods such as time division, space division multiplexing (SDM), or code division. The processing or control by the hybrid mode (pseudo IBSS mode) of the AP mode and the STA mode may be included in layer 2.5, for example.

In FIG. 17, upon focusing on node A, an association procedure exemplified in FIG. 16A is executed between node A (AP mode) and each of node B (STA mode) and node C (STA mode) that have received the beacon signals of which transmission source is node A.

Node A operates in the STA mode in the relationship with node B in accordance with the reception of a beacon signal of which transmission source is node B (AP mode). Therefore, the association procedure exemplified in FIG. 16B is executed between node A (STA mode) and node B (AP mode).

Similarly, node A operates in the STA mode in the relationship with node C in accordance with the reception of a beacon signal of which transmission source is node C (AP mode). Therefore, the association procedure exemplified in FIG. 16C is executed between node A (STA mode) and node C (AP mode).

Also for nodes B and C, the association procedures as those exemplified in FIGS. 16A, 16B, and 16C are executed with other peripheral nodes in accordance with the AP mode and the STA mode as with node A.

As described above, wireless link are linked up between nodes A and B, between nodes B and C, and between nodes C and A. When a plurality of wireless links of different channels are linked up, the plurality of wireless links may be aggregated (or bonded) to one radio band.

REFERENCE SIGNS LIST

1 Wireless communication system
3 Wireless node
5 Backbone network
7 Terminal apparatus
9 Backhaul (BH) network
31 Processor
32 Memory
33 Storage
34 Input/output (I/O) apparatus
35, 36 Wireless interface (IF)
37, 39 Wired interface (IF)
38 Bus
301, 302 Wireless communication section
303 Wired communication section
304 Control section
305 Storage section
341 Scan processing section
342 Node management section
343 Tree route control section
344 IPT control section
350, 360 Antenna
3431 Route control packet generation section
3432 Route metric calculation section
3433 Tree route update section

The invention claimed is:

1. A wireless route control method, comprising:
transmitting a control signal from a first wireless node among a plurality of wireless nodes that forms a backhaul network, the control signal being a signal to be propagated by each of a plurality of wireless links linked up in a mesh topology between the plurality of wireless nodes; and
selecting, for a transmission route of a data signal in a tree topology, by each of second wireless nodes among the plurality of wireless nodes, the second wireless nodes being different from the first wireless node, one of the plurality of linked-up wireless links corresponding to parent wireless nodes positioned in an upstream direction toward the first wireless node from among the plurality of wireless links linked up in each of the second wireless nodes in the mesh topology, based on an indicator indicative of a radio wave propagation quality of one or more of the plurality of wireless links through which each of a plurality of the control signals received through different routes has propagated.

2. The wireless route control method according to claim 1, wherein:
the first wireless node transmits the control signal multiple times, and
each of the second wireless nodes updates the wireless link selected for the transmission route of the data signal, in accordance with a variation in the indicator calculated for each reception of the control signal transmitted multiple times.

3. The wireless route control method according to claim 1, wherein:
each of the second wireless nodes calculates, using the control signal received through one or more of the wireless links linked up in each of the second wireless nodes, the indicator of the one or more of the wireless links, and
each of the second wireless nodes transmits the calculated indicator to each of the wireless links linked up in the second wireless node, by including the calculated indicator in the control signal.

4. The wireless route control method according to claim 3, wherein the calculating of the indicator of the one or more of the wireless links through which the control signal has propagated includes calculating a cumulative value of the indicator included in the received control signal and the indicator calculated using the received control signal.

5. The wireless route control method according to claim 1, wherein:
the first wireless node intermittently transmits the data signal with a period in accordance with a frequency reuse interval, and
each of the second wireless nodes relays the data signal received from the selected wireless link to the wireless link selected by a subsequent one of the second wireless nodes.

6. The wireless route control method according to claim 1, wherein the plurality of wireless links between the plurality of wireless nodes are linked up by way of transceiving a beacon signal between the plurality of wireless nodes using an ad hoc mode.

7. A wireless communication system, comprising:
a first wireless node being one of a plurality of wireless nodes that forms a backhaul network, the first wireless node transmitting a control signal to be propagated by each of a plurality of wireless links linked up in a mesh topology between the plurality of wireless nodes; and
a second wireless node being different from the first wireless node and being one of a plurality of second wireless nodes among the plurality of wireless nodes, the second wireless node selecting, for a transmission route of a data signal in a tree topology, one of the plurality of linked-up wireless links corresponding to parent wireless nodes positioned in an upstream direction in the tree topology toward the first wireless node from among the plurality of wireless links linked up in the mesh topology in the second wireless node, based on an indicator indicative of a wireless wave propagation quality of one or more of the plurality of wireless links through which each of a plurality of the control signals received through different routes has propagated.

8. A wireless node that is a first wireless node being one of a plurality of wireless nodes, the first wireless node comprising:
- a processor configured to generate a control signal to be propagated by each of a plurality of wireless links linked up in a mesh topology between the plurality of wireless nodes that forms a backhaul network; and
- a transmitter configured to transmit the control signal to a wireless link linked up in the first wireless node, wherein
- the control signal is used by each of a plurality of second wireless nodes among the plurality of wireless nodes to select, the second wireless nodes being different from the first wireless node, for a transmission route of a data signal in a tree topology, one of the plurality of linked-up wireless links corresponding to parent wireless nodes positioned in an upstream direction in the tree topology toward the first wireless node from among the plurality of wireless links linked up in the mesh topology in the second wireless node, based on an indicator indicative of a radio wave propagation quality of one or more of the plurality of wireless links through which each of a plurality of the control signals received through different routes has propagated.

9. A wireless node being one of a plurality of second wireless nodes different from a first wireless node among a plurality of wireless nodes, the second wireless node comprising:
- a receiver configured receiver, through one or more wireless links linked up in the plurality of second wireless nodes among a plurality of wireless links liked up in a mesh topology between the plurality of wireless nodes that forms a backhaul network, a control signal transmitted by the first wireless node to be propagated by the plurality of wireless links; and
- a processor configured to select, for a transmission route of a data signal in a tree topology, one of the plurality of linked-up wireless links corresponding to parent wireless nodes positioned in an upstream direction in the tree topology toward the first wireless node from among the plurality of wireless links linked up in the mesh topology in the second wireless node, based on an indicator indicative of a wireless wave propagation quality of one or more of the plurality of wireless links through which each of a plurality of the control signals received through different routes has propagated.

10. A computer-readable non-transitory recording medium including a wireless route control program recorded therein, the program causing a processor provided in a first wireless node being one of a plurality of wireless nodes to perform processing comprising:
- generating a control signal to be propagated by each of a plurality of wireless links linked up in a mesh topology between the plurality of wireless nodes that forms a backhaul network; and
- transmitting the control signal to a wireless link linked up in the first wireless node, wherein
- the control signal is used by each of a plurality of second wireless nodes among the plurality of wireless nodes to select, the plurality of second wireless nodes being different from the first wireless node, for a transmission route of a data signal in a tree topology, one of the plurality of linked-up wireless links corresponding to parent wireless nodes positioned in an upstream direction in the tree topology toward the first wireless node from among the plurality of wireless links linked up in the second wireless node, based on an indicator indicative of a radio wave propagation quality of one or more of the plurality of wireless links through which each of a plurality of the control signals received through different routes has propagated.

11. A computer-readable non-transitory recording medium including a wireless route control program recorded therein, the program causing a processor provided in one of a plurality of second wireless nodes different from a first wireless node among a plurality of wireless nodes to perform processing comprising:
- receiving, through one or more wireless links linked up in the second wireless node among a plurality of wireless links liked up in a mesh topology between the plurality of wireless nodes that forms a backhaul network, a control signal transmitted by the first wireless node to be propagated by the plurality of wireless links; and
- selecting, for a transmission route of a data signal in a tree topology, one of the plurality of linked-up wireless links corresponding to parent wireless nodes positioned in an upstream direction in the tree topology toward the first wireless node from among the plurality of wireless links linked up in the mesh topology in the second wireless node, based on an indicator indicative of a radio wave propagation quality of one or more of the plurality of wireless links through which each of a plurality of the control signals received through different routes has propagated.

12. A wireless route control method, comprising selecting at least a part of a plurality of wireless links linked up in a mesh topology between a plurality of wireless nodes, for an element of a wireless link set in a tree topology having a specific wireless node on a top, based on an autonomous decentralized control in individual wireless nodes.

13. The wireless route control method according to claim 12, wherein the part of the plurality of wireless links to be selected for the element of the wireless link set in the tree topology is changed in accordance with a variation in a radio wave propagation quality of the plurality of wireless links in the mesh topology.

14. The wireless route control method according to claim 1, wherein
- the first wireless node and each of the plurality of second wireless nodes determine a downstream wireless link to be selected, the downstream wireless link being directed to another second wireless node when an ACK signal is received from the another second wireless node.

15. The wireless node according to claim 9, wherein the second wireless node determines a downstream wireless link to be selected, the downstream wireless link being directed to another second wireless node when an ACK signal is received from the another second wireless node.

* * * * *